(12) United States Patent
Sáenz Löbsack

(10) Patent No.: US 12,045,393 B2
(45) Date of Patent: Jul. 23, 2024

(54) HAND-WORN DATA-INPUT DEVICE

(71) Applicant: THUMBRAY TECHNOLOGIES, S.L., Madrid (ES)

(72) Inventor: Daniel Sáenz Löbsack, Madrid (ES)

(73) Assignee: THUMBRAY TECHNOLOGIES SL, Madrid (ES)

(*) Notice: Subject to any disclaimer, the term of this patent is extended or adjusted under 35 U.S.C. 154(b) by 272 days.

(21) Appl. No.: 17/628,909

(22) PCT Filed: Jul. 31, 2020

(86) PCT No.: PCT/EP2020/071675
§ 371 (c)(1),
(2) Date: Jan. 21, 2022

(87) PCT Pub. No.: WO2021/019075
PCT Pub. Date: Feb. 4, 2021

(65) Prior Publication Data
US 2022/0244790 A1     Aug. 4, 2022

(30) Foreign Application Priority Data

Jul. 31, 2019 (EP) ..................................... 19382659

(51) Int. Cl.
*G06F 3/01* (2006.01)
*G06F 1/16* (2006.01)
(Continued)

(52) U.S. Cl.
CPC .............. *G06F 3/017* (2013.01); *G06F 1/163* (2013.01); *G06F 1/1656* (2013.01); *G06F 3/011* (2013.01);
(Continued)

(58) Field of Classification Search
None
See application file for complete search history.

(56) References Cited

U.S. PATENT DOCUMENTS 6,141,643 A   10/2000  Harmon
6,380,923 B1   4/2002  Fukumoto et al.
(Continued)

FOREIGN PATENT DOCUMENTS

CN       1766943 A     5/2006
JP    2007287086 A    11/2007
(Continued)

*Primary Examiner* — Christopher J Fibbi

(57) ABSTRACT

A hand-worn data-input device is provided. The hand-worn data-input device is wearable on a hand, for entering data-inputs into electronic/computing devices by reading and interpreting, via electromagnetic sensing, static/dynamic user-inputted gestures between digits, other portions of the hand and other hand-worn components of the data-input device, relative to each other, wherein sensing units are configured to be placed at/by specific spots/regions of the hand and comprise fixation, insulating and/or electromagnetic shielding means, and wherein the hand-worn data-input device comprises at least one energy unit, at least one thumb-worn sensing unit, at least one body-contact sensing unit, at least one signals/data connection unit and at least one data-inputs connection unit, and wherein when fingertip sensing units are worn, the fingertip sensing units are uniquely identified and simultaneous multi-channeled electromagnetic coupling between the fingertip sensing units and other sensing units is enabled.

20 Claims, 7 Drawing Sheets

(51) Int. Cl.
  *G06F 3/0354* (2013.01)
  *G06F 3/044* (2006.01)
(52) U.S. Cl.
  CPC .......... *G06F 3/014* (2013.01); *G06F 3/03547* (2013.01); *G06F 3/044* (2013.01)

(56) References Cited

U.S. PATENT DOCUMENTS

| | | |
|---|---|---|
| 7,109,970 B1 | 9/2006 | Miller |
| 7,839,383 B2 | 11/2010 | Li et al. |
| 8,743,052 B1 | 6/2014 | Keller et al. |
| 10,043,125 B2* | 8/2018 | Park .................. H04M 1/72412 |
| 2003/0001578 A1 | 1/2003 | Lam |
| 2004/0263473 A1 | 12/2004 | Cho et al. |
| 2007/0132722 A1 | 6/2007 | Kim et al. |
| 2010/0156783 A1 | 6/2010 | Bajramovic |
| 2010/0220054 A1 | 9/2010 | Noda et al. |
| 2011/0187637 A1 | 8/2011 | Nichols |
| 2012/0139708 A1 | 6/2012 | Paradiso et al. |
| 2012/0262369 A1* | 10/2012 | Griffin .................... G06F 3/014 345/157 |
| 2012/0299810 A1* | 11/2012 | Trent ...................... G06F 3/033 345/156 |
| 2012/0319940 A1 | 12/2012 | Bress et al. |
| 2013/0169420 A1 | 7/2013 | Blount, Jr. et al. |
| 2015/0185852 A1 | 7/2015 | Guo |
| 2015/0355719 A1* | 12/2015 | Suman .................... G06F 3/017 345/156 |
| 2016/0259408 A1 | 9/2016 | Messingher et al. |
| 2016/0313798 A1* | 10/2016 | Connor .................... G06F 3/017 |
| 2017/0027479 A1 | 2/2017 | Friedman et al. |
| 2017/0075425 A1* | 3/2017 | Kursula .................... G06F 3/014 |
| 2018/0018070 A1* | 1/2018 | Bhageria ................ G06F 3/017 |

FOREIGN PATENT DOCUMENTS

| | | |
|---|---|---|
| WO | 2007076592 A1 | 7/2007 |
| WO | 2009024971 A2 | 2/2009 |

* cited by examiner

HAND-WORN DATA-INPUT DEVICE

CROSS REFERENCE TO THE RELATED APPLICATIONS

This application is the national stage entry of International Application No. PCT/EP2020/071675, filed on Jul. 31, 2020, which is based upon and claims priority to European Patent Application No. 19382659.1 filed on Jul. 31, 2019, the entire contents of which are incorporated herein by reference.

TECHNICAL FIELD

The present invention relates to a hand-worn data-input device, more specifically to a single-hand wearable device to enter different sorts of data into client electronic or computing devices, by means of reading and interpreting, via electromagnetic sensing, different static or dynamic gestures that fundamentally take place between the thumb instrumented with parts of the claimed device and, either the skin or nails of the rest of the digits (fingers) of the same hand, or other worn parts of the claimed device.

The device could potentially replace/integrate a considerable number of current input interfacing devices (keyboards, mouse, keypads, touchscreens, tactile pads, etc.) and provide miscellaneous significant benefits:
- improved health & safety (because it eliminates the need for touching any not hand-worn interfacing elements, thus especially indicated to avoid/minimize risk of spread/contagion of bacteria or virus during disease times such as those lived under the Covid coronavirus pandemics),
- wearability and portability (because of its ease of use, minimal volume, compactness . . . ),
- suitability for one-hand disabled users and for one-hand occupied users (because it engages only one hand),
- suitability for sight-limited users and for sight-disabled users (because it reads and interprets user-inputted gestures that can be learnt to be executed without the need of having to look at the hand),
- suitability under certain hazardous or inconvenient environments (because operating is not affected by occlusions or light conditions),
- costs reductions linked to instrumental simplification (because it integrates multiple different interfacing devices into a single one . . . ),
- screen size optimization (because it eliminates the need for having on-screen keyboards on computing devices such as mobile phones),
- wide applicability (because its potential richness of inputs can cover any languages and any large set of characters or commands . . . ), and
- unique user customization (because it can be used as biometrical authentication and security access system).

BACKGROUND

Some new wearable data-input solutions have attempted to overcome the drawbacks of current complex and cumbersome widely used data interfacing devices like keyboards, mice and touchscreens; however, they have succeeded only partially, insufficiently or, in practice, inconveniently. As a matter of fact, a majority of those new solutions imply some new disadvantages such as those related to annulment of bare-skin tactile capacities, wearing discomfort, sense of bulkiness, complexity of use, operating limitations (e.g. affection by occlusions), poor richness of interaction (e.g. limited range of chords), unreliability of readings, restrictions in environmental factors, or dependence of additional external elements. Following there are some examples of those unsuccessful or only partially successful inventions:

US2016259408A1 discloses a complex data-input device comprising a glove interface object with outwards-oriented sensors (with sensing conductive pads not in touch with the skin of the hand) combined with a head-mounted display, requiring the user to employ not only one hand (occluding its whole skin surface with the glove-like device) but also his/her eyes and part of the head.

US2013169420A1 discloses an electronic control glove presenting outwards-oriented not body-contact sensors, placed on different spots of the external surface of the glove covering the fingers in order to enable detection of basic hand gestures but touching a conductive pad on a digit with a conductive pad on a thumb acting as gesture selector. US20070132722 and U.S. Pat. No. 6,141,643A also disclose one-hand data-input devices that are fully embedded within a glove-type garment covering the whole hand.

US2010220054A1 discloses a ring-like data-input wearable device, configured to be worn on an index finger and comprising an adjacent pair of ring-shaped signal electrodes which generate a current flow facilitating detection of skin-to-skin contacts. WO2009024971 also discloses a one-finger ring-type user-input device fundamentally based on mechanical sensing technology, wherein user actions and gestures are identified via mechanical sensing of relative rotations and positions between stationary and rotatable sections comprised within the device.

US20120139708 discloses a one- or two-hands device to track finger and hand gestures fundamentally based on RFID technology, wherein signals used are in a range of 700-1000 MHz, wherein signal sensing units are passive RFID tags which are attached via rings or stripes to the distal segments of the fingers, and wherein the signal emitting unit is an RFID element attached to other parts of the body via garments such as a belt or a sleeve.

US2011187637 discloses a one-hand tactile input device fundamentally based on capacitive sensing technology, wherein sensing units are tactile capacitance sensors attached to ring-shaped elements worn on distal segments of digits 2-5.

U.S. Pat. No. 7,109,970B1 discloses a data-input device using a combination of voice commands and finger movements, using a plurality of finger-shaped sleeves that have embedded at least one contact-sensitive element and a microphone, wherein all receiving units of the contact-sensitive elements are exterior.

U.S. Pat. No. 6,380,923B1 discloses a wearable data-input device fundamentally based on shock sensing technology, wherein user actions are executed via strikes of the fingers on a physical surface, and wherein sensors are shock sensors such as accelerometers and are supported on ring-shaped elements worn on all fingers.

US20120319940 discloses a two-hands multi-finger data-input device fundamentally based on acceleration sensing technology, wherein sensors are attached to ring-shaped elements wearable on the proximal segments of the fingers.

U.S. Pat. No. 8,743,052B1 and US20150185852A1 disclose ring-type thumb-worn data-input devices fundamentally based on acceleration sensing technology (not on capacitive sensing technology), wherein the main sensor is just one accelerometer attached to the user's thumb.

US20100156783 discloses a one-hand data-input device supported by a partial hand-covering garment which is fundamentally based on surface-contact sensing technology. Similarly, U.S. Pat. No. 7,839,383B2 discloses a partial-glove type device that does not cover all fingers.

US20040263473 discloses a one-hand data-input device which detects motions fundamentally by means of photography and image-recognition technology, wherein the device comprises a bracelet with a camera and finger-worn ring-shaped elements including motion sensors.

Many novel hand-based systems to input data, based or not on the mentioned patents, have also been presented through a variety of scientific publications. However, none of them has proved to be a solid, comfortable and non-occlusive one-hand-wearable data-input solution. Following there are some examples of those disclosures and their basic drawbacks:

'SkinTrack', 'Abracadabra', 'SkinPut', 'iSkin', 'Omnitouch' and 'HoverFlow' are conceived not for one, but for two hands;

'Kitty', 'DigiTouch' and 'FJG Wearable Keypad' are one-hand wearables but based on a glove that occludes the majority of the skin of the hand;

'LightRing', 'SmartFinger', 'CyclopsRing', 'PickRing', 'PinchWatch', 'FingerInput' and 'TypingRing' are one-hand/wrist not glove-based wearables, but quite limited in their functionality due to using only one ring or wrist band and/or due to being fundamentally based on sensing of user's input gestures via infrared proximity/depth sensors, cameras, gyroscopes or accelerometers, and/or due to needing additional elements such as external surfaces or not hand/wrist-worn components.

In contrast with the referred state of the art, the present invention presents some fundamental advantages that can be synthesized in the following: minimal occlusion of only one hand, electromagnetic sensing to identify contacts between fingertip sensing units and bare-skin via body-contact sensing units, and multiple electromagnetically differentiated sensing units on a thumb selector to provide multi-channeled communications/interactions.

By means of the hereby presented invention, it should be possible to overcome not only many of the general drawbacks of current widely used interfacing systems, but also many of the disadvantages associated to new state-of-the-art wearable data-input systems and methods. Furthermore, this invention could potentially imply a revolutionary technological contribution of value to thousands of millions of users as it could significantly improve the simplicity, speed, and freedom of maneuverability with which those users interact with their personal electronic devices on a daily basis.

In view of the foregoing prior art, an object of the present invention is to provide an improved device for human-computer interaction through hand motion.

A further object of the invention is to provide a device adapted for use by a single hand of the user.

A further object of the invention is to provide a device fundamentally based on contact (touch/approximation) sensing technologies.

A further object of the invention is to provide a device conceived to detect and process user-inputted gestures that involve physical contacts between the thumb and other digits (fingers) of the same hand, all of them minimally instrumented.

A further object of the invention is to provide a device which is fundamentally based on electromagnetic sensing technologies.

SUMMARY

At least part of the above objects is solved by a device according to claim 1. Advantageous embodiments and further aspects of the invention are subject of the dependent claims.

In order to facilitate summarized and detailed descriptions of the invention, some assumptions and terminology clarifications need to be made:

the device is described as worn in operating position;

"wearing" of the device or its elements is understood in its broader meaning and as equivalent to "carrying", thus also including, for example, carrying of elements as skin- or nail-implanted components;

"skin" is used to refer to "human body tissue", which comprises not only skin, but also nail tissue and any other external or internal tissues of the human body;

"sensing" is understood in its broader meaning, this is, including equivalent, similar and/or closely associated actions/activities such as "reading", "measuring", "detecting" or "identifying";

"electromagnetic" is understood in its broader meaning, this is, relating to any phenomena of electromagnetism concerning magnetic as well as electric fields/circuits;

"electromagnetic sensing" is understood in its broader meaning, this is, including any sensing technologies associated to electromagnetic phenomena, such as capacitive (or capacitance) sensing, inductive sensing or simple electrical current/potential sensing;

"sensing units" are whole or parts of electromagnetic sensors such as capacitive/capacitance sensors, inductive sensors or electrical sensors;

"conductive terminal" is understood in its broader meaning, this is, equivalent to conductive pad, conductive plate, electrode or the like, in sum equivalent to any component made out of a conductive material, meant to hold, receive or convey electromagnetic energy, and presenting any shape such as a plate, a pad, a pin, a ring, a coil, a mesh, etc.;

"electromagnetic coupling" is understood in its broader meaning, this is, referring to electromagnetic matching (with possible transfers of electromagnetic energy) between two media mutually affected by a same electromagnetic field or circuit;

electromagnetically coupled sensing units having conductive terminals adequately configured and placed within the electromagnetic fields/circuits in which they participate, are able to detect and measure variations in quantity and quality of the materials acting as dielectrics within said electromagnetic fields/circuits and/or variations of distances between the conductive terminals participating in said electromagnetic circuits/fields;

when sensing units are coupled, one or several of them include the means necessary to create/generate and shape the electromagnetic signals used in their sensing functions (e.g. an oscillator circuit);

"electromagnetic signals" is understood in its broader meaning, this is, referring to information not only from electromagnetic radiations (e.g. wave amplitude, wavelength, wave frequency, capacitance, etc.) but also from electrostatic circuits (e.g. electric potential, current intensity, resistance, conductance, etc.).

user-inputted gestures consist of actions in which parts of the hand and/or elements of the device participate in order to reach or execute static positions (chords or discrete gestures) and/or dynamic movements (or dynamic gestures);

user's static or dynamic contacts or contacting actions refer not only to physical touch interactions but also to approximating, near-touching or almost-touching physical/electromagnetic interactions;

"variations" is understood in its broader meaning, this is, referring not only to changes but also to differences or differentials.

The solution involves, in a first embodiment, a data-input device for entering inputs of data into a client electronic or computing device, the data-input device configured to be worn by a user on only one single hand, namely on the thumb (also referred as 1st digit or $1^{st}$ finger of the hand) and at least on one of digits $2^{nd}$, $3^{rd}$, $4^{th}$, and $5^{th}$ (also referred as digits 2-5 or fingers 2-5) or of interdigital areas $1^{st}$, $2^{nd}$, $3^{rd}$ or $4^{th}$ of the hand (also referred as interdigits 1-4).

The data-inputs for the client device (outputs of the data-input device) result from reading and interpreting user-inputted gestures, which consist of positions and movements between digits, other portions of the hand and components of the data-input device worn on the hand, relative to each other.

The majority of these positions and movements of the user's hand instrumented with the data-input device are interactions between the thumb and other digits of the same hand on which elements of the device are worn.

User-inputted gestures can be classified as static gestures (static hand/fingers positions, also referred as chords or as discrete gestures), dynamic gestures (dynamic hand/fingers interactions, also referred as continuous gestures), or combinations of both. Dynamic gestures may comprise a variety of movement actions such as approximating, pressuring or sliding actions, also comprising any actions executed to arrive to static gestures.

Reading and interpreting of user-inputted gestures is fundamentally achieved via electromagnetic sensing, this is, via sensing variations of information read from electromagnetic fields/circuits in which sensing units (parts/whole of electromagnetic sensors) participate and where, when a user-inputted gesture is executed, electromagnetically coupled conductive terminals of sensing units vary distances between each other and/or vary the quantities and qualities of dielectric materials (such as air or human body tissue) separating each other.

Electromagnetic sensing of the device is performed by sensing units configured to be placed at/by specific spots/regions of the hand.

Sensing units can be "fingertip" sensing units and "not-fingertip" sensing units;

fingertip sensing units refer to sensing units that are devised or configured with conductive terminals to be worn at distal segments of digits or in regions adjacent to them;

not-fingertip sensing units refer to sensing units that are devised or configured with conductive terminals to be worn on parts of the hand that are not those on which conductive terminals of fingertip sensing units are worn.

In a first embodiment, the data-input device comprises:

at least one energy unit to provide energy used by the data-input device (to perform tasks such as generating, transforming, preparing and transmitting the power energy needed by the whole data-input device);

at least one fingertip sensing unit worn on the thumb;

at least one body-contact sensing unit with conductive terminal(s) in touch with human body tissue, worn on an interdigit or on a digit that is not the thumb, and configured to sense electromagnetic coupling wherein human body tissue acts as dielectric;

at least one processing unit to process information from electromagnetic coupling sensed by sensing units and to generate data-inputs to be sent to the client device (to perform tasks such as scanning, cleaning, transforming, processing, storing . . . information from electromagnetic sensing);

at least one energy connection unit for transmitting (wirelessly or via cable) power from energy units to other components of the data-input device;

at least one signals/data connection unit for connecting (wirelessly or via cable) sensing units with processing units;

at least one data-inputs connection unit for connecting (wirelessly or via cable) processing units with the client device.

The data-input device may further comprise a variety of optional auxiliary components.

Each fingertip sensing unit further comprises at least one outwards-oriented conductive terminal(s) configured not to be in direct contact with human body tissue (configured to facilitate using the fingertip sensing unit as a touching selector);

insulating and/or electromagnetic shielding (or guarding) means (e.g. to avoid or reduce electromagnetic coupling between the fingertip sensing unit and human body tissue supporting the fingertip sensing unit, or to improve coupling of the fingertip sensing unit and other sensing units);

fixation means to fix and support the fingertip sensing unit and to assure removable attachment of whole or part of it.

In a preferred first embodiment, when two or more fingertip sensing units are worn on a same digit or on different digits, electromagnetic signals used by said fingertip sensing units are generated at different frequencies and/or with different characteristics in order to enable unique identification of each individual fingertip sensing unit when participating in user-inputted gestures and to facilitate simultaneous multi-channeled electromagnetic coupling between said fingertip sensing units and other sensing units. This feature of multi-channeled electromagnetic interactions/communications allows, if needed, to perfectly differentiate physical participation of different fingertip sensing units within a same user-inputted gesture, be it a static gesture, a dynamic gesture, or a combination of both.

In a further embodiment, the data-input device further comprises one or more further sensing unit(s) not worn on fingertips, referred as not-fingertip sensing unit(s), which are worn on interdigits (interdigits 1-4) or on digits that are not the thumb (digits 2-5). Said not-fingertip sensing unit(s) can be body-contact sensing units and/or conductor-contact sensing units.

As previously stated, body-contact sensing units (of which the data-input device comprises at least one) are not-fingertip sensing units with conductive terminals touching human body tissue (when in operating position), worn on one of digits 2-5 or interdigits 1-4 (preferably on proximal segments of digits or interdigits) and configured to use electromagnetic sensing through human body tissue.

In contrast, conductor-contact sensing units, are not-fingertip sensing units with outwards-oriented conductive terminal(s) not in touch with human body tissue and configured to sense electromagnetic coupling wherein nil or variable amount of air acts as dielectric.

When conductive terminals of conductor-contact sensing units are directly touched by conductive terminals of fingertip sensing units (electromagnetic coupling between conductive materials with nil amount of air or human body tissue acting as dielectric between them), said conductor-contact sensing units can sense variations in electromagnetic signals (such as differentials of electrostatic potential energy) associated to the electrical circuit in which the fingertip sensing unit and the conductor-contact sensing unit participate.

When conductive terminals of conductor-contact sensing units are approximated to conductive terminals of a fingertip sensing units (electromagnetic coupling between conductive materials with at least a certain amount of air acting as dielectric between them), said conductor-contact sensing units can sense variations in electromagnetic signals (such as in capacitance) associated to the electromagnetic field/circuit in which the fingertip sensing unit and the conductor-contact sensing unit participate.

In a still further embodiment, conductive terminals of conductor-contact sensing units are configured to be placed by the volar and/or radial side of the proximal segments of the digits.

Each body-contact sensing unit comprises:
- at least one inwards-oriented conductive terminal(s) configured to be in touch with human body tissue,
- insulating and/or electromagnetic shielding means,
- fixation means to fix and support the body-contact sensing unit and to assure removable-attachment of whole or part of it.

And each conductor-contact sensing unit comprises:
- at least one outwards-oriented conductive terminal(s) configured not to be in touch with human body tissue,
- insulating and/or electromagnetic shielding means,
- fixation means to fix and support the conductor-contact sensing unit and to assure removable-attachment of whole or part of it.

A body-contact sensing unit has conductive terminals and fixation, insulating and electromagnetic shielding/guarding means configured to assure and optimize sensing of electromagnetic couplings through the human body tissue (e.g. avoiding/minimizing possible interferences from not skin-touching contacts). In contrast, a conductor-contact sensing unit has conductive terminals and fixation, insulating and electromagnetic shielding/guarding means configured to assure and optimize sensing of electromagnetic couplings precisely not through human body tissue but through variable amount of air (as in an approximating action from a fingertip sensing unit) or through nil amount of dielectric (as in a direct touch with a fingertip sensing unit).

When one or several fingertip sensing units are worn on a same digit, said fingertip sensing unit(s) is(are) integrated into a set of elements that have a common support. This set of elements is referred as fingertip set, When one or several not-fingertip sensing units are worn on a same digit, said not-fingertip sensing unit(s) is(are) integrated into a set of elements that have a common support. This set of elements is referred as digital set, When one or several not-fingertip sensing units are worn on a same interdigit, said not-fingertip sensing unit(s) is(are) integrated into a set of elements that have a common support. This set of elements is referred as interdigital set.

In an exemplary embodiment, a support of a fingertip set presents a shape fundamentally composed by a hood-like element configured be worn on a digit fully/partially covering or wrapping its fingertip and/or other parts of its skin surface.

In another exemplary embodiment, a support of a fingertip set presents a shape fundamentally composed by a ring-like element configured to be worn on the digit partially covering or occluding its skin surface. In another version of this exemplary embodiment, the support is a hybrid combination of a ring-based and a hood-based support as it includes a hood-like element attached to said ring-like element and configured to be worn on or over the digit fully/partially covering or wrapping its fingertip.

In another exemplary embodiment, a support of a fingertip set is easily attachable/detachable to/from a digit by means of an attachment mechanism or the like that allows easy engagement/disengagement with/from a small auxiliary component that is fixedly attached to the user's fingernail.

In another embodiment, a support of a fingertip set consists of an artificial nail complementing, extending or replacing the user's fingernail and integrating the at least one fingertip sensing unit.

In a further embodiment, a support of a fingertip set consists of a partial implant of the at least one fingertip sensing unit inside the human body tissue of the user's fingertip, leaving outwards-oriented conductive terminals of said fingertip sensing unit(s) facing to the outside and sticking out of the skin.

In still further embodiments, a support of a fingertip set may consist of any of the following combinations:
- a circled ring-like element combined with a hood-like element;
- a circled ring-like element combined with a fingernail attachment mechanism or the like;
- a circled ring-like element combined with an artificial nail;
- a circled ring-like element combined with a partial implant.

Furthermore, in a preferred embodiment, a support of a digital set presents a shape of a fully/partially circled ring-like element configured to be worn on the proximal segments of a digit.

In another version of the prior preferred embodiment a support of a digital set presents adjustment components/adaptations to allow rotational and/or translational adjusting of supported not-fingertip sensing units into their specific wearing/operating positions.

In another version of the prior embodiment, a support of an interdigital set presents a shape that comprises a combination of a hook-like shape, configured to be worn on the interdigit, and two partially circled ring-like shapes, configured to be worn on proximal segments of digits adjacent to the interdigit.

In a still further version of the prior embodiment, the support of the interdigital set comprises a movable joint to allow articulated connection between two parts of the said support, the movable joint being configured to induce separation and/or avoid approximation of the two connected parts of the said support from each other whilst keeping them connected via the movable joint. In order to improve wearability and to facilitate adequate contact of the supported body-contact sensing units with the human body tissue of the digits, different configurations may be considered to induce separation and/or avoid approximation from each other of the two joint-connected parts of the support whilst keeping them connected via the movable joint, for example via specific shapes and/or materials of the parts and/or via additional simple pressure-exerting mechanisms like spring-mechanisms or the like.

In a further preferred embodiment, at least one digital set or one interdigital set comprises a not-fingertip-set contact detector that detects touching contacts with intervention of said at least one set and without intervention of fingertip sensing units.

The not-fingertip-set contact detector is a sensor-like component that can identify interactions between adjacent-worn not-fingertip sets, and/or between a not-fingertip set and adjacent digits, and/or between parts of a same interdigital set. Contacts where not-fingertip sensing units participate but fingertip sensing units do not intervene, are referred as not-fingertip-set contacts. Detection of these contacts, which are fundamentally binary (touch or no touch), may be done using simple electromagnetic sensing and with the aid of existing or auxiliary elements of the data-input device. For example, in order to detect contacts between adjacent-worn not-fingertip sets, said elements can be configured to be placed facing each other, one by the ulnar side of a digit on which one not-fingertip-set is worn, and the other one by the radial side of the nearest adjacent digit on which the other not-fingertip set is worn.

In further possible embodiments, adjacent digital or interdigital sets are joined to each other by means of flexible bridging elements. These bridging elements, referred as bridges may have varied purposes such as facilitating handling of the not-fingertip sets or reducing the number and length of signals/data connection units.

In further preferred embodiments, conductor-contact sensing units are configured to be placed by the volar and/or radial side of proximal segments of the digits. And in still further preferred embodiments, conductor-contact sensing units worn on a same digit are two in number: one configured to be worn by the volar side of the proximal segment of said digit, and the other one configured to be worn by the radial side of the proximal segment of said digit.

In a further preferred embodiment, the data-input device further comprises a bracelet-type component that is worn on the wrist of the hand and is configured to facilitate temporary hosting of all or part of the components of the data-input device. This wrist-worn bracelet-type component is referred as bracelet and it may permanently host elements of the data-input device that do not necessarily have to be worn on digits or interdigits, such as energy units, processing units or certain auxiliary components.

In another further preferred embodiment, energy units are permanently placed within the bracelet and energy connection units are either wireless or use a cabling system that is automatically or semi-automatically retractable or able to be rolled-up or be foldable into the bracelet.

In another further preferred embodiment, processing units are permanently placed within the bracelet and signals/data connection units are either wireless or use a cabling system that is automatically or semi-automatically retractable or able to be rolled-up or be foldable into the bracelet.

In another further advanced preferred embodiment, body-contact sensing units are at least two in number and worn on different digits and processing units are configured to enable using delimited surfaces of skin of the hand as touchpads on which dynamic gestures, consisting of positioning and/or sliding a fingertip set acting as a pointer, are converted into dynamic variations of data-inputs for a client-device. Said delimited surfaces of the skin of the hand are referred as "skin touchpads"

In this last embodiment, mostly when dynamic user-inputted gestures are interpreted, performance of the data-input device depends greatly on the extent in number and positioning of sensing units and on whether the processing capacity of the data-input device is sufficiently enhanced so as to enable fast sensing and transformation of user-inputted gestures into data-inputs used by the client device.

In a still further advanced preferred embodiment, the whole or parts of the thumb-reachable volar and radial skin areas of digits 2-5 is configured as a skin touchpad allowing the user wearing the data-input device to introduce dynamic bi-dimensional positional data-inputs into the screen of a client device.

In another further preferred embodiment, the data-input device further comprises one or more further fingertip-sensing unit(s) worn on digits that are not the thumb, and/or one or more further not-fingertip sensing unit(s) worn on the thumb.

And in still another further preferred embodiment, when one or several body-contact sensing units are worn on a same digit, said body-contact sensing unit(s) are supported and attached to said digit by means of a non-removable not-fingertip-set support configured as a full implant of said body-contact sensing unit(s) inside the human body tissue of the user's digit leaving said body-contact sensing unit(s) completely under the skin and in contact with the human body tissue.

DETAILED DESCRIPTION OF THE EMBODIMENTS

Figure 1:
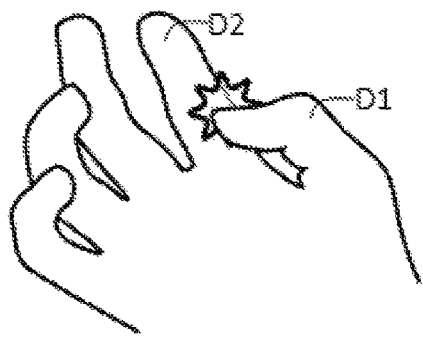
FIG. 1: Example of right-hand static gesture or chord.

The following aspects are important to the different embodiments of the invention.

In some of the subsequent text paragraphs, reference signs are mentioned which appear in the attached drawings.

Wearability

The data-input device is meant to be worn by the user on only one of his/her hands, preferably on the thumb (referred as $1^{st}$ digit/finger, digit 1 or D1) and on at least one of digits $2^{nd}$, $3^{rd}$, $4^{th}$ and $5^{th}$ (referred as digits/fingers that are not the thumb, digits 2-5 or D2-5) or of interdigits $1^{st}$, $2^{nd}$, $3^{rd}$ and $4^{th}$ (referred as interdigital areas of the hand, interdigits 1-4 or I1-4).

The data-input device does not cover or significantly occlude any of the user's skin or nails of the hand except for portions of skin or nail of the thumb, and portions of skin of proximal segments of digits 2-5 or of interdigits 1-4. This is a strong differential characteristic versus glove-like devices found in the state of the art.

User-Inputted Gestures

The data supplied by the data-input device (referred as "data-inputs") are destined to feed a client electronic appliance, computing device or the like (referred as "client device" or CD). Those data-inputs result from reading, identifying and interpreting user-inputted gestures of the user's hand instrumented with the data-input device, wherein the majority of said gestures are interactions between digits of the same hand, wearing or not elements of the device. These user-inputted gestures can, singly or in combination, fundamentally comprise:

discrete static positions (referred as "chords" or "static gestures"), dynamic movements (referred as "dynamic gestures"), such as sliding-like touching or almost-touching (approximating) actions or also pressure actions.

A highly extended range of user-inputted gestures can potentially be sensed by the data-input device, also those executed when in the process of arriving to specific discrete or dynamic gestures.

The majority of user-inputted gestures identified and processed by the data-input device are static and dynamic gestures implying interactions that take place between elements of the data-input device worn on the thumb and other parts of the hand or the worn device, such as areas of digits 2-5 or interdigits 1-4, wherein the instrumented thumb directly contacts the skin or nail of said digits or interdigits, or elements of the data-input device worn on said digits or interdigits, are executable without any need of physical interaction with external elements other than those comprised within the data-input device and worn on the user's hand;

and can be generated by the user without having to have or use his/her sight capabilities.

Reading and interpreting user-inputted gestures where skin is touched and/or pressed is achieved via sensing electromagnetic couplings between fingertip sensing units and "body-contact" sensing units (referred as BU1/2/3 . . . ), said body-contact sensing units presenting conductive terminal(s) in touch with human body tissue and being configured to sense electromagnetic signals through human body tissue acting as dielectric.

Reading and interpreting user-inputted gestures where not-fingertip sets are almost-touched (such as in approximating actions) or directly touched is achieved via sensing electromagnetic couplings between fingertip sensing units and "conductor-contact" sensing units (referred as CU1/2/3 . . . ), said conductor-contact sensing units presenting conductive terminal(s) not in touch with human body tissue and being configured to sense electromagnetic signals through nil quantity (direct touch) or variable quantity (approximating or near-touch contact) of air acting as dielectric.

Detection of a direct touch between a finger-tip sensing unit and a conductor-contact sensing unit can be understood as a very basic case of electromagnetic sensing where there is nil dielectric in the electromagnetic coupling (as neither air nor human body tissue act as dielectric between the conductive pads of the sensing units) and where detection of contact or no-contact is achieved via simple identification of an electrical contact between a pair conductive components participating in a simple electrostatic circuit Fundamental technology used by the data-input device is electromagnetic sensing. Hence, sensors such as accelerometers, gyroscopes, infrared, optical or other physical pressure or bending sensing devices may be complementary but are not key to the invention.

The majority of electromagnetic signals used by the data-input device can be small radiations of currents with amperage below 1 mA and frequency below 1 MHz.

Key Components

In a first exemplary embodiment, the invention comprises the following components:

one or more units sourcing energy (referred as "energy units") to provide the power needed by the whole data-input device and especially that needed for its electromagnetic sensing, one or more sensing units worn on a fingertip (referred as "fingertip sensing units" or FU1/2/3 . . . ) worn preferably on digit 1 wherein said fingertip sensing unit(s) are organized in a set with common supporting functions (set referred as "fingertip set" or, if worn on the thumb, referred as "thumb's fingertip set" or FS1), at least one body-contact sensing unit with conductive terminal(s) in touch with human body tissue, worn on an interdigit or on a digit that is not the thumb, and configured to sense electromagnetic coupling wherein human body tissue acts as dielectric, one or more processing and data storage elements (also referred as "processing units") that scan, clean, process, transform and store information from electromagnetic signals sensed and data derived from them in order to generate the data-inputs to be sent to a client device, one or more wireless or cabled energy conveying elements (referred as "energy connection units" or EC) that convey power to components of the data-input device, one or more wireless or cabled signals or data conveying elements (referred as "signals/data connection units" or SC) that convey information from electromagnetic signals sensed, or data derived from them, from sensing units to processing units, one or more wireless or cabled data-inputs connecting elements (referred as "data-inputs connection units" or IC) that convey data-inputs from processing units to a client device, a variety of optional auxiliary components such as on-off switching units, mode buttons, reset buttons, connectors, luminous status indicators, or aids that further facilitate proper configuration, adjustment, wearing, operation and other activities associated to the data-input device.

Fingertip Sensing Units

The majority of fingertip sensing units are configured to be placed at/by specific (approximately always-the-same, pre-established or priorly fixed) spots/regions of the hand.

Each fingertip sensing unit comprises:
at least one outwards-oriented sensing conductive terminal(s) or the like configured not to be in direct contact with the human body tissue of the digit on which the fingertip sensing unit is worn, at least one element(s) with insulating and/or electromagnetic guarding or shielding properties (referred as "insulating/guarding component"(s) or IN) to control and improve quality of electromagnetic couplings (and preferably placed between the conductive pads and the human body tissue of the digit wearing the sensing unit in order to avoid/mitigate electromagnetic couplings between the fingertip sensing unit and the human body tissue of said digit), a variety of supporting components (fixation means) to support the fingertip sensing unit and assure it is attachable to (and removable from) specific (fixed or pre-established) approximate spot/regions of the surface of the skin or nail of the digit wearing the sensing unit.

Not-Fingertip Sensing Units

The majority of not-fingertip sensing units are configured to be placed at/by specific spots/regions of the hand (pre-established approximately always-the-same fixed positions).

Not-fingertip sensing units can be "body-contact" sensing units or "conductor-contact" sensing units.

Body-contact sensing units (referred as BU1/2/3 . . . ) are those configured to process electromagnetic signals sensed through human body tissue that were generated/shaped as consequence of a physical interaction (generally a touching action, but being also possible other actions such as an approximating, sliding action or pressuring actions) between a fingertip sensing unit and human body tissue (generally skin or nail) of the hand of the user.

Each body-contact sensing unit comprises:
at least one inwards-oriented conductive terminal(s) with sensing face(s) configured to be in direct contact with the human body tissue, insulating and/or electromagnetic shielding or guarding means to control and improve quality of electromagnetic couplings through human body-tissue (preferably placed/supported on top of the said conductive terminal(s) in order to avoid/mitigate interferences with electromagnetic signals sensed between fingertip sensing units and the body-contact sensing unit), fixation means to fix and support the body-contact sensing unit and assure each body-contact sensing unit is removably attached to the hand (to the digit, interdigit or other parts of the hand on which it is worn).

Body-contact sensing units are preferably configured to be worn on proximal segments of digits 1-5 and/or on interdigits 1-4.

The data-input device comprises at least one body-contact sensing unit.

Conductor-contact sensing units (referred as CU1/2/3 . . . ) are those configured to process electromagnetic signals sensed in electromagnetic couplings between fingertip sensing units and said conductor-contact sensing units wherein human body-tissue does not act as a key dielectric (as it occurs in electromagnetic couplings with body-contact sensing units). The key dielectric in electromagnetic couplings between fingertip sensing units and conductor-contact sensing units is either a variable amount of air (such as in the case of an approximating action), or is considered inexistent or nil amount of air (such as in the case of a direct touching or sliding action between the conductive terminals of the fingertip and conductor-contact sensing unit).

Each conductor-contact sensing unit comprises:
at least one outwards-oriented conductive terminal(s) with sensing face(s) configured not to be in direct contact with the human body tissue of the hand that is supporting the conductor-contact sensing unit, insulating and/or electromagnetic shielding or guarding means to control and improve quality of electromagnetic couplings of the device (preferably placed/supported between the said conductive terminal(s) and the human body tissue in order to avoid/mitigate unintended electromagnetic couplings precisely through human body tissue), fixation means to fix and support the conductor-contact sensing unit and assure each conductor-contact sensing unit is removably attached to the hand or finger.

In preferred embodiments of the invention, conductor-contact sensing units are configured to be placed by the volar and/or radial side of the proximal segments of the digits.

In still further preferred embodiments of the invention, conductor-contact sensing units worn on a same digit are two in number: one configured to be worn with conductive terminals placed by the volar side of the proximal segment of said finger, and the other one configured to be worn with conductive pads placed by the radial side of the proximal segment of said finger.

Types of Contacts

User-inputted gestures consist of positions and movements between digits and other portions of the hand instrumented or not with components of the data-input device, relative to each other. These user-inputted gestures can be static (discrete) or dynamic and they may comprise one or several of the following:

a contact action between a fingertip sensing unit and human body tissue of the hand (such as skin or nails of a digit), referred as "fingertip-skin" contact or F-S;

a contact action between a fingertip sensing unit and a conductor-contact sensing unit, referred as "fingertip-not-fingertip contact" or F-N;

a contact action between a not-fingertip set and an adjacent part of the hand, or between two not-fingertip sets, or between parts of a not-fingertip set, referred as "not-fingertip-set contact" or N-N;

a contact action between portions of human body tissue (such as skin or nails) of different parts of the hand (referred as "skin-skin contact" or S-S).

The majority of user-inputted gestures processed by the data-input device imply actions in which the thumb's fingertip set participates, this is, fingertip-skin contacts and fingertip-not-fingertip contacts.

Multi-Channeled Coupling

In a preferred embodiment of the invention, fingertip sensing units worn on a same digit are more than one in number and a majority of them use electromagnetic signals at different frequencies and/or with different characteristics with the purposes of enabling simultaneous multi-channeled electromagnetic sensing between fingertip and not-fingertip sensing units and of facilitating unique identification of each fingertip sensing unit when participating in user-inputted gesture.

Fingertip Sets and their Supports

When one or several fingertip sensing units are worn on a same digit, said fingertip sensing units are integrated into a set of elements referred as "fingertip set". Fingertip sensing units of a fingertip set are preferably bound to each other and attached to a same digit by means of a common support.

Furthermore, in a preferred embodiment of the invention, the support of a fingertip-set is "hood-based", this is, it presents a shape fundamentally composed by a hood-like element configured be worn on the digit fully/partially covering or wrapping its fingertip and/or other parts of its skin surface.

In order to facilitate proper adjustment to the finger, a hood-based support of a fingertip set is preferably composed by flexible materials with certain degree of elasticity.

In an alternative embodiment of the invention, a support of a fingertip set is "ring-based", presenting a shape fundamentally composed by a fully/partially circled ring-like element (referred as "ring-element" or RE) and being configured to be worn on the digit partially covering or occluding its skin surface.

In order to facilitate proper adjustment to the digit, a ring-based support of a fingertip set is preferably composed fundamentally by rigid or semi-rigid materials.

In another version of this alternative embodiment of the invention, the support of a fingertip set is a hybrid combination of a ring-based support of a fingertip set (including a ring-like element) and a hood-based support of a fingertip set (also including a hood-like element covering part or all of the tip of the finger).

In another alternative embodiment of the invention, a support of a fingertip set is easily attachable/detachable to/from the digit by means of an attachment mechanism or the like that allows easy engagement/disengagement with/from a small auxiliary component that is fixedly attached to the user's fingernail.

In a further embodiment, a support of a fingertip set consists of an artificial nail complementing, extending or replacing the user's fingernail and integrating the at least one fingertip sensing unit.

In a further embodiment, a support of a fingertip set consists of an implant of at least one fingertip sensing unit inside the human body tissue of the user's fingertip, leaving outwards-oriented conductive pad(s) of said fingertip sensing unit(s) with sensing faces oriented to the outside and sticking out of the skin.

Digital and Interdigital Sets

When one or several not-fingertip sensing units are worn on a same digit, said not-fingertip sensing units are integrated into a set of elements referred as "digital set". Not-fingertip sensing units of a digital set are preferably bound to each other and attached to a same digit by means of a common support. Digital sets are referred as DS2-5 if respectively worn on digits 2-5 (D2-5).

When one or several not-fingertip sensing units are worn on a same interdigit, said not-fingertip sensing units are integrated into a set of elements referred as "interdigital set". Not-fingertip sensing units of an interdigital set are preferably bound to each other and attached to a same digit by means of a common support. Interdigital sets are referred as IS1-4 if respectively worn on interdigits 1-4 (I1-4).

Signals/data connection units (SC) are referred as SC1-4 if respectively associated to digital sets DS1-4 or interdigital sets IS1-4, or SC5 if associated to digital set DS5.

Ring-Based Digital Sets

Furthermore, in a preferred embodiment of the invention, at least one support of a digital set presents a "ring-based" shape, this is, a shape fundamentally composed by a fully/partially circled ring-like element configured to be worn on the proximal segments of digits.

In a further version of the prior preferred embodiment, digit supports can present adjustment components/adaptations to allow fast, easy and precise rotational and/or translational adjusting of supported not-fingertip sensing units into their specific (approximately always-the-same) optimal wearing/operating positions.

An example of these adjustment components/adaptations (referred as "lateral rotation adjustors" or LRA) are lateral flat-surfaces on ulnar and radial sides that face each other and belong to ring-based digital sets worn on adjacent digits.

Another example of adjustment components/adaptations (referred as "top rotational adjustors" or TRA) are specific marks, carvings or protuberances placed at the top external surface of ring-based digital sets.

Hook/Ring-Based Interdigital Sets

In a further embodiment of the invention, at least one support of an interdigital set presents a "hook/rings-based" shape, this is, a shape that comprises a combination of a hook-like shape, configured to be worn on said interdigit, and two not-fully circled ring-like shapes, configured to be worn on proximal segments of the digits adjacent to said interdigit.

In a further embodiment, a hook/rings-based support of an interdigital set comprises a movable joint (referred as MJ) to allow articulated connection between two parts of the interdigital set.

Hook/rings-based supports of interdigital sets with movable joints may also be configured, via specific shapes and/or materials and/or via additional simple spring-mechanism or the like, to induce separation and/or avoid approximation of the two connected parts relative each other, whilst keeping them connected via the movable joint, in order to improve wearability and to facilitate adequate contact of the supported body-contact sensing units with the human body tissue of the digits.

Implanted Sensing Units

In a further embodiment, when one or several body-contact sensing units are worn on a same digit, said body-contact sensing unit(s) can be supported and attached to said digit by means of a non-removable supporting component configured as a full implant of said body-contact sensing unit(s) inside the human body tissue of the user's digit, leaving said body-contact sensing unit(s) completely under the skin and in contact with human body tissue.

Not-Fingertip-Set Contact Detectors

In a further preferred embodiment of the invention, at least one digital set or one interdigital set comprises a component (referred as "not-fingertip-set contact detector" or NND) that detects touching contacts with intervention of said at least one set and without intervention of fingertip sensing units. It could for example be a simple electrical or mechanical sensor, that can detect contacts between said set and a digit adjacent to the digit/interdigit on which said set is worn, or contacts between said set and another digital/interdigital set adjacently worn, or contacts between parts of said set that can move relative to each other.

These not-fingertip-set contact detectors enrich and extend the range of detectable user-inputted gestures to be processed by the data-input device.

In a still further preferred embodiment of the invention, not-fingertip-set contact detectors can identify not-fingertip-set contacts by detecting simple contact between existing or auxiliary elements of the data-input device that are attached to a first set and a second set that are adjacent to each other and that can be digital or interdigital sets, wherein said elements are configured to be placed facing each other, one by the ulnar side of a digit to which the first set is associated, and the other one by the radial side of the nearest adjacent digit to which the second set is associated.

Bridging Elements

In possible embodiments of the invention, digital or interdigital sets can be "bridged" or joined to each other by means of bridging elements (referred as "bridges" or BR) with purposes of facilitating fast, easy and correct handling (putting on, taking off and adjusting) of the digital/interdigital sets and/or of reducing the number and complexity of signals/data connection units.

In order to facilitate proper adjustment and wearing of the digital/interdigital sets whilst comfortable wearing and agile operation of the data-input device, bridges are preferably composed by materials having certain degrees of flexibility and elasticity.

Identification of User-Inputted Gestures

The data-input device is intended to univocally and unequivocally identify and interpret a significantly rich and high range of user-inputted gestures thanks to possibly presenting:

different fingertip sensing units attached to different specific spots/regions of a same fingertip or of different fingertips, different body-contact sensing units and conductor-contact sensing units attached to different specific spots/regions of a same digit/interdigit or of different digit/interdigits of the hand, different channels of electromagnetic coupling by using electromagnetic signals with different characteristics (implying multi-channeled communications between fingertip and not-fingertip sensing units), A specific chord can be properly identified, for example, by adequately reading the following variables:

which chording modes and hand gesture languages are active at the time of the execution of the chord, which body-contact sensing units sense electromagnetic signals and what are the specific characteristics of those signals (to identify fingertip sensing units/channels of electromagnetic coupling used and possible/approximate points of skin contacted in fingertip-skin contacts), which conductor-contact sensing units are contacted and by which fingertip sensing units (to identify fingertip-not-fingertip contacts), which not-fingertip sets contact with adjacent digits or with other not-fingertip sets (to identify not-fingertip-set contacts).

Performance of the data-input device, understood as speed and resolution of sensing (key when sensing dynamic user-inputted gestures such as approximating or sliding actions relative to a delimited area of skin of the hand) or accuracy of the estimations of the points of contact of fingertip-skin contacts (including certainty of whether other types of contacts have also intervened in the user-inputted gestures), may increase highly not only with the processing power, sensitivity and resolution of the sensors/sensing units, but also with the number of communication/electromagnetic coupling channels as well as with the number and variety of the placements of body-contact and conductor-contact sensing units.

The inclusion of additional fingertip sets apart from the thumb's fingertip set could also further increase the performance of the data-input device.

Interpretation of User-Inputted Gestures

In order for the data-input device to adequately interpret and convert into data-inputs for a client device user-inputted gestures executed by a user, the user must use a specific hand gesture language and must also have the data-input device configured with said hand gesture language uploaded/registered and activated.

Hand gesture languages are meant to provide a set of differentiated static/dynamic gestures as ample and rich as necessary to be able to cover the whole range of possible data-inputs required by a client device. They may be standard or customized, and they are generally devised to optimize speed and easiness of gesturing actions.

Some user-inputted gestures, be it static or dynamic, may be interpreted and converted not into data-inputs for the client device, but into commands for the data-input device. Specific chords may be reserved, for example, to reset the data-input device, to switch between data-input modes to be employed by the user (e.g. static vs dynamic gestures), to switch between sets of chords to be employed by the user (e.g. numbers vs letters vs symbols, or characters vs words, or to choose from different hand gesture languages), to switch between interpretation/transformational rules to be used by the data-input device (e.g. Spanish vs English language), or to switch between skin touchpads (e.g. whole hand vs only dorsal area of digits 2-5 vs longitudinal radial area of index digit vs no skin touchpad mode).

Identical chords may be interpreted differently depending on the active mode(s) at the time of execution of the chord and/or depending on the user actions realized previously or posteriorly to the execution of the chord.

Resulting data-inputs to be sent to a client device may be of varied sort: alphanumeric characters, numbers, symbols, commands, spatial positioning data, etc.

In enhanced embodiments of the data-input device, fundamentally relating to improved number, disposition, and sensing capabilities of sensing units as well as processing capacity of processing units, performance of the data-input device is sufficient to enable fast and reliable sensing, interpretation and conversion of dynamic user-inputted gestures such as approximation, sliding or pressuring actions (which can be sensed and processed as a series of multiple very rapidly executed discrete user-inputted gestures). In these enhanced configurations, the data-input device can also be configured to enable using skin regions of the hand as skin touchpads where dynamic user-inputted gestures relative to said skin touchpad are immediately converted into equivalent variations of data-inputs for a client device.

As means of example to illustrate this last advanced functionality, when using the dorsal area of digits 2-5 as a skin touchpad, spatial touching positioning of a fingertip set relative to said skin touchpad can be automatically converted into equivalent spatial positioning of a pointer within the screen of a client device.

In the referred enhanced embodiments of the data-input device, body-contact sensing units are at least two in number and worn on different digits and processing units are configured to enable using delimited surfaces of skin of the hand as touchpads on which dynamic gestures, consisting of positioning and/or sliding a fingertip set acting as a pointer, are converted into dynamic variations of data-inputs for a client-device.

Bracelet & Connection Units

Another preferred embodiment of the invention further comprises a bracelet-type component (referred as "bracelet" or BR) that is worn on the wrist of the hand and that can permanently or temporarily host some elements of the data-input device. Exemplary permanently hosted elements could be any elements that, when in operating mode, do not necessarily have to be worn on the digits or interdigits of the hand (such as the whole or parts of energy units, processing units and auxiliary components). Exemplary temporarily hosted elements could be any elements that, when in operating mode, do have to be worn on the digits or interdigits of the hand (such as the whole or parts of fingertip sets, digital/interdigital sets, energy connection units and signals/data connection units).

The bracelet can also integrate additional complementary elements to the data-input device such as watches, screens, cameras, accelerometers or other sensors.

In a further embodiment of the invention, energy units are very minimal in size and weight and can be embedded within fingertip sets.

In further preferred embodiment of the invention, energy units are permanently placed within the bracelet and energy connection units are either wireless or using a cabling system that is automatically or semi-automatically retractable or able to be rolled-up or be foldable into the bracelet, possibly taking the complementary function of creating a moderate pulling pressure towards the wrist to aid supporting function of worn digital/interdigital sets, in addition to facilitating collection and hosting of cables into the bracelet when the data-input device is not worn in operating mode.

In another further preferred embodiment of the invention, processing units are permanently placed within the bracelet and signals/data connection units are either wireless or use a cabling system that is automatically or semi-automatically retractable or able to be rolled-up or be foldable into the bracelet, possibly taking the complementary function of creating a moderate pulling pressure towards the wrist to aid supporting function of worn not-fingertip-set supports, in addition to facilitating collection and hosting of the cables into the bracelet when the data-input device is not worn in operating mode.

DETAILED DESCRIPTION OF THE DRAWINGS

Bearing in mind the exposed concepts and functionalities common to the different embodiments, the different embodiments reflected in the attached figures are below described in greater detail:

FIG. 1 illustrates a right-hand static user-inputted gesture or chord, which is one of the relevant types of user-inputted gestures that can be identified and interpreted by the proposed data-input device. In this figure, the chord is exemplified as a touching contact between the $1^{st}$ digit (thumb) D1 and the $2^{nd}$ digit D2.

Figure 2:
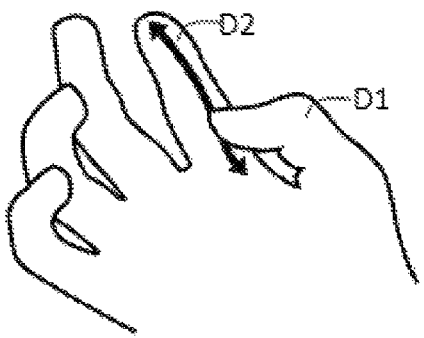
FIG. 2: Example of right-hand dynamic gesture.

FIG. 2 illustrates a right-hand dynamic user-inputted gesture, which is one of the relevant types of user-inputted gestures that can be identified and interpreted by the proposed data-input device. In this figure, the dynamic gesture is exemplified as a sliding touching contact between the $1^{st}$ digit (thumb) D1 and the $2^{nd}$ digit D2.

Figure 3:
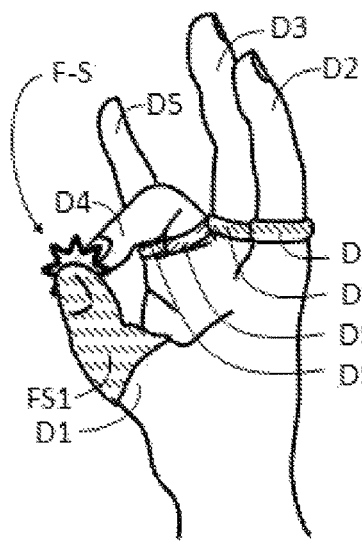
FIG. 3: Example of right-hand fingertip-skin contact.

FIG. 3 shows an example of a right-hand chord executed by a user wearing the proposed data-input device, wherein the identification of the chord is based on detecting a fingertip-skin contact F-S, herein exemplified as a touching contact between the thumb's fingertip set FS1 (worn on digit D1), and the $4^{th}$ digit D4. This figure also shows digital sets DS2-5, respectively worn on digits D2-5 (the not-thumb digits).

Figure 4:
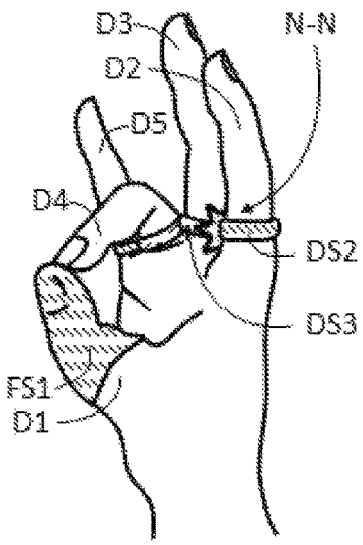
FIG. 4: Example of right-hand not-fingertip-set contact.

FIG. 4 shows the same right-hand chord of FIG. 3 wherein the identification of the chord can be complemented with the detection of a not-fingertip-set contact N-N, herein exemplified as a touching contact between digital set DS2 (worn on digit D2) and digital set DS3 (worn on digit D3). As in FIG. 3, a thumb's fingertip set FS1 is worn on the thumb D1.

Figure 5:
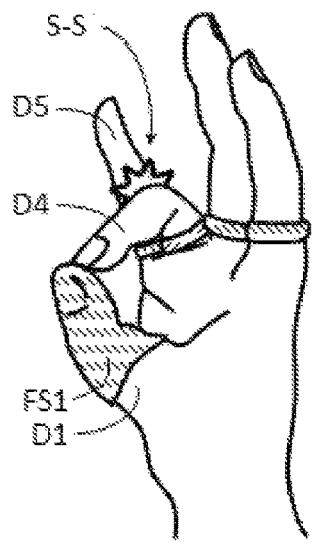
FIG. 5: Example of right-hand skin-skin contact.

FIG. 5 shows the same right-hand chord of FIG. 3 wherein the identification of the chord can be complemented with the detection of a skin-skin contact S-S, herein exemplified as a touching contact between the $4^{th}$ digit D4 and the $5^{th}$ digit D5. Again, as in FIGS. 3-4, a thumb's fingertip set FS1 is worn on the thumb D1.

Figure 6:
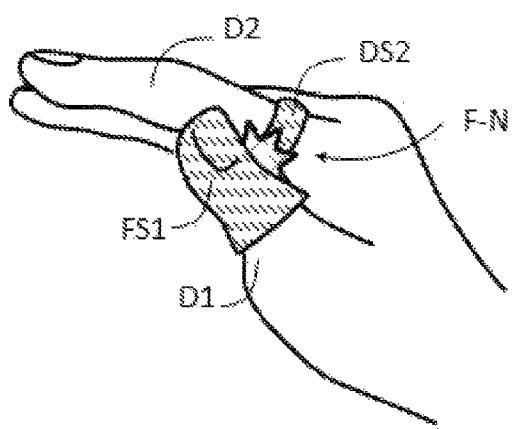
FIG. 6: Example of right-hand fingertip-not-fingertip contact.

FIG. 6 shows another different example of a right-hand chord executed by a user wearing the data-input device, wherein the identification of the chord is based on detecting a fingertip-not-fingertip contact F-N, herein exemplified as a touching contact between the thumb's fingertip set FS1 worn on thumb D1 and a digital set DS2 worn on $2^{nd}$ digit D2.

Figure 7:
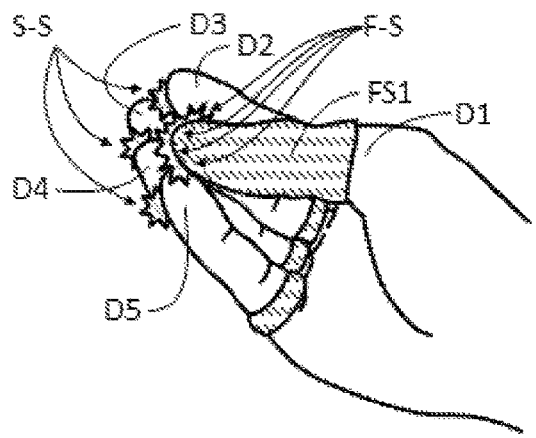
FIG. 7: Example of right-hand chord with simultaneous multiple fingertip-skin and skin-skin contacts.

FIG. 7 shows another different example of a right-hand more complex chord executed by a user wearing the data-input device, wherein the identification of the chord is fundamentally based on detecting multiple simultaneous fingertip-skin contacts F-S, possibly also complemented with the detection of skin-skin contacts S-S. In this figure, the exemplified simultaneous fingertip-skin contacts F-S take place between the thumb's fingertip set FS1 and the $2^{nd}$ digit D2, between the thumb's fingertip set FS1 and the $3^{rd}$ digit D3, between the thumb's fingertip set FS1 and the $4^{th}$ digit D4, and between the thumb's fingertip set FS1 and the $5^{th}$ digit D5; and the exemplified simultaneous skin-skin contacts S-S take place between $2^{nd}$ digit D2 and $3^{rd}$ digit D3, between $3^{rd}$ digit D3 and $4^{th}$ digit D4, and between $4^{th}$ digit D4 and $5^{th}$ digit D5.

Figure 8A:
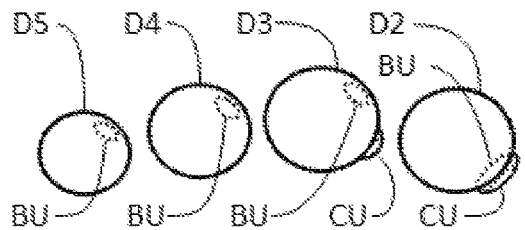
FIG. 8A: Schematic front sectional view of digits with body-contact sensing units implanted in digits D2-5 and conductor-contact sensing units implanted in digits D2 and D3.
Figure 8B:
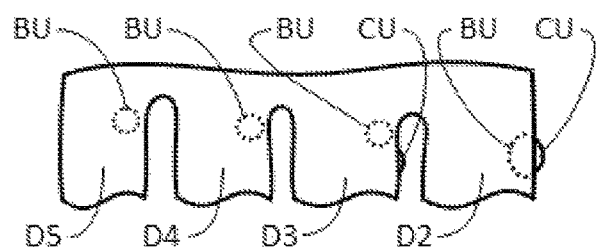
FIG. 8B: Schematic top dorsal-side-of-hand view of embodiment of FIG. 8A.

FIGS. 8A-8B show, in a front sectional view (FIG. 8A) and in a top dorsal-side-of-hand view (FIG. 8B), an exemplary embodiment of the invention worn on a right-hand wherein the body-contact and conductor-contact sensing units are implanted in digits D2-5. Transversal sections of digits D2-5 are schematically represented as circles in FIG. 8A, thumb being omitted. Each of digits D2-5 present one body-contact sensing unit BU implanted under the skin of the top radial side of proximal segment of the digit. Digit D3 additionally presents a conductor-contact sensing unit CU partially implanted under the skin at the volar-radial side of the proximal segment of the digit. Digit D2 presents a body-contact sensing unit BU and a conductor-contact sensing unit CU, both integrated in one single component that is partially implanted under the skin at the volar-radial side of the proximal segment of the digit, leaving body-contact sensing unit BU completely under the skin and in contact with the human body tissue, and leaving conductor-contact sensing unit CU facing outwards and sticking out of the skin.

Figure 9A:
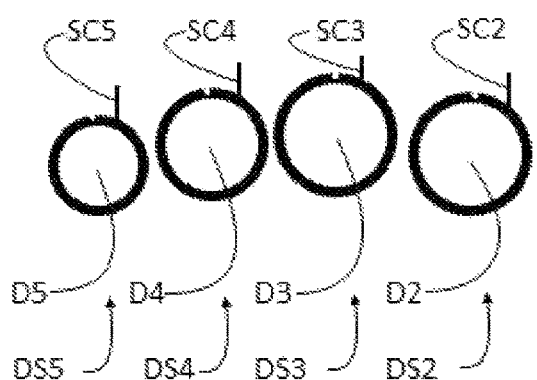
FIG. 9A: Schematic front sectional view of digital sets.
Figure 9B:
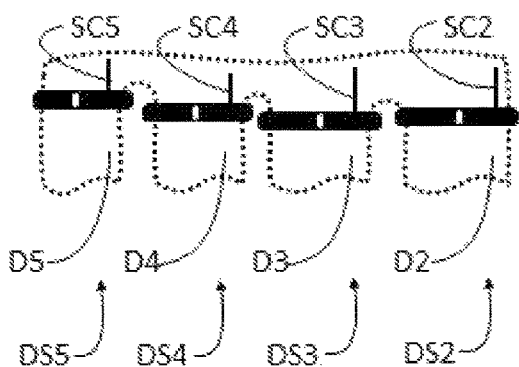
FIG. 9B: Schematic top dorsal-side-of-hand view of embodiment of FIG. 9A.

FIGS. 9A-9B show, as an embodiment of the invention worn on a right-hand, ring-based digital sets DS2-5 for respective digits D2-D5, in a front sectional view (FIG. 9A) and in a top dorsal-side-of-hand view (FIG. 9B). In this embodiment, supports for digital sets DS2-5 have the shape of fully circled rings and digital sets DS2-5 are connected to processing units by respective cabled signals/data connection units SC2-5.

Figure 10A:
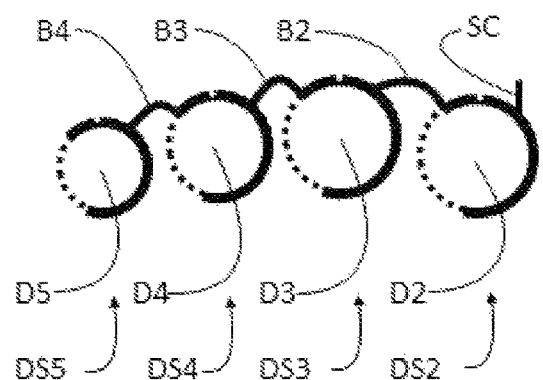
FIG. 10A: Schematic front sectional view of bridged digital sets.
Figure 10B:
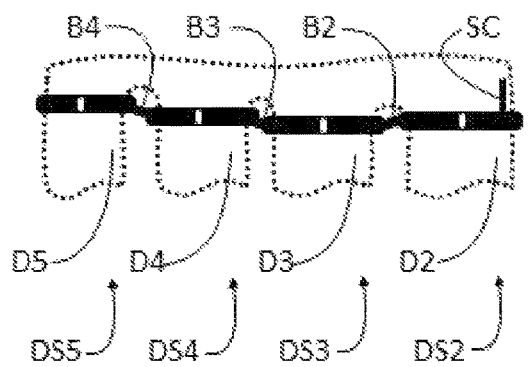
FIG. 10B: Schematic top dorsal-side-of-hand view of embodiment of FIG. 10A.

FIGS. 10A-10B show a similar embodiment as that of FIGS. 9A-9B, presenting same front-sectional view (FIG. 10A) and same top dorsal-side-of-hand view (FIG. 10B), and partly using same reference numerals. However, in this embodiment digital sets DS2-5 are joined to each other by means of bridge-like elements (bridges) B2-4, to facilitate fast, easy and correct putting on, taking off and adjusting of said not-fingertip sets. In these figures, supports of digital sets DS2-5 are partially circled rings, and digital sets of adjacent digits are connected to each other in the following manner: bridge B2 connects digital set DS2 with digital set DS3, bridge B3 connects digital set DS3 with digital set DS4, and bridge B4 connects digital set DS4 with digital set DS5. In order to facilitate proper adjustment of digital sets DS2-5 whilst agile operation of the data-input device, bridges B2-4 are preferably composed by materials having certain degrees of flexibility and elasticity. In this embodiment, digital sets DS2-5 are connected to processing units by a single cabled signal/data connection unit SC.

Figure 11:
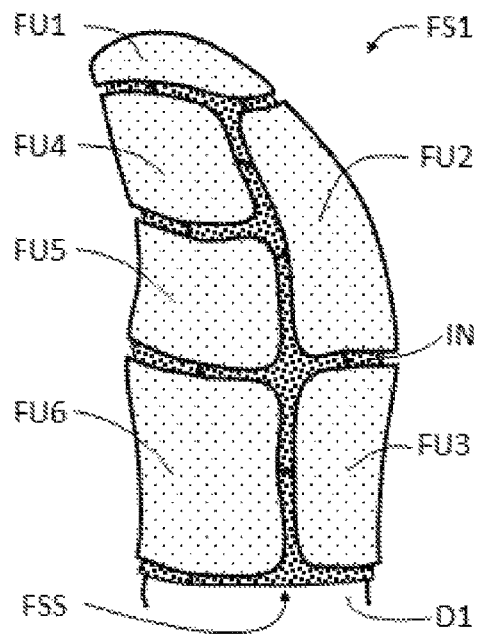
FIG. 11: Top-lateral perspective view of hood-based thumb's fingertip set.

FIG. 11 shows a preferred embodiment of the invention, where the support of a fingertip set FSS of a thumb's fingertip set FS1 presents the shape of a hood or the like and is configured be worn on the thumb D1 fully/partially covering or wrapping its fingertip and/or other parts of the surface of the thumb D1. The figure depicts then a top-lateral perspective view of a hood-based thumb's fingertip set FS1 for the right hand. The thumb's fingertip set FS1 comprises a plurality of fingertip sensing units FU1-6 supported on an integrated fingertip-set support FSS which also includes insulating/shielding/guarding components IN, in this example just the necessary to impede/mitigate and/or control direct flowing of electromagnetic radiations between conductive pads of fingertip sensing units and the human body tissue of the digit holding said fingertip sensing units, in this case the thumb D1. Each of fingertip sensing units FU1-6 comprises one or more conductive terminals (not shown).

Figure 12:
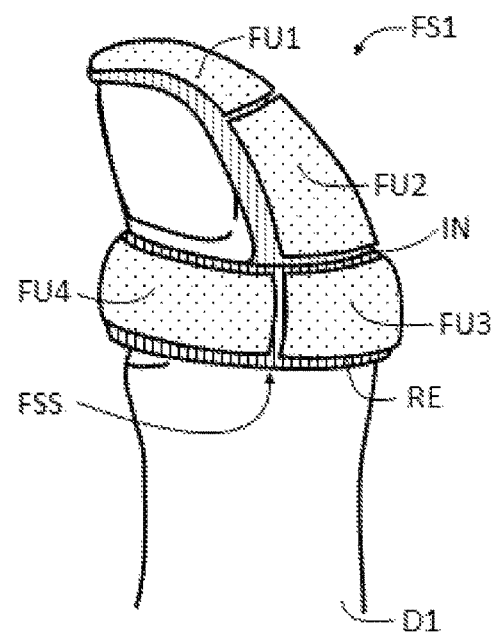
FIG. 12: Top-lateral perspective view of ring-based thumb's fingertip set.

FIG. 12 shows a similar configuration of a thumb's fingertip set FS1, however not hood-based but ring-based, as it is fundamentally supported on a ring-like element RE. In this alternative embodiment of the invention, the fingertip set FS1 is configured to be worn on the thumb D1 covering just a part of it (the front and upper portion of it), and it presents an integrated support FSS that is based on a fully circled ring-shaped element RE. The integrated support FSS also includes insulating/shielding/guarding components IN, in this example just the necessary to impede/mitigate and/or control flowing of electromagnetic signals from fingertip sensing units into the human body tissue of the digit holding said fingertip sensing units.

Figure 13:
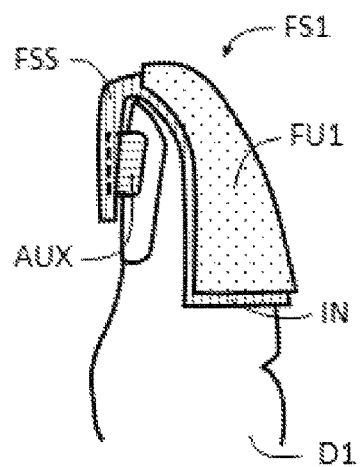
FIG. 13: Lateral schematic view of nail-attached thumb's fingertip set including only one fingertip sensing unit.

FIG. 13 shows a further embodiment of the invention, where the support FSS of a thumb's fingertip set FS1 including one fingertip sensing unit FU1 is easily attachable/detachable to/from the digit by means of an attachment mechanism or the like that allows easy engagement/disengagement with/from a small auxiliary component AUX that is fixedly attached to the user's fingernail. For greater clarity of the figure, the depicted embodiment shows a fingertip set including a single fingertip sensing unit. However, as stated above, there may be more than one fingertip sensing unit in the same fingertip set.

Figure 14:
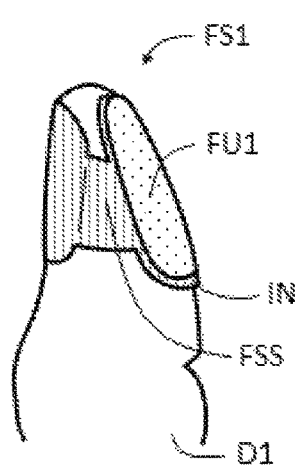
FIG. 14: Lateral schematic view of nail-integrated thumb's fingertip set including only one fingertip sensing unit.

FIG. 14 shows a further embodiment of the invention, where the support FSS of a thumb's fingertip set FS1 including one fingertip sensing unit FU1 is integrated with an artificial nail complementing, extending or replacing the user's fingernail. For greater clarity of the figure, the depicted embodiment shows a fingertip set including a single fingertip sensing unit. However, as stated above, there may be more than one fingertip sensing unit in the same fingertip set.

Figure 15:
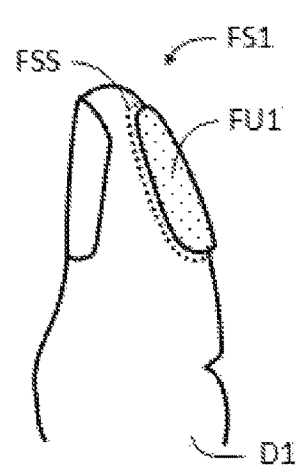
FIG. 15: Lateral schematic view of skin-implanted thumb's fingertip set including only one fingertip sensing unit.

FIG. 15 shows a further embodiment of the invention, where the support FSS of a thumb's fingertip set FS1 including one fingertip sensing unit FU1 is implanted inside the human body tissue of the user's fingertip, leaving outwards-oriented conductive terminal(s) of said fingertip sensing unit facing to the outside and sticking out of the skin. For greater clarity of the figure, the depicted embodiment shows a fingertip set including a single fingertip sensing unit. However, as stated above, there may be more than one fingertip sensing unit in the same fingertip set.

Figure 16:
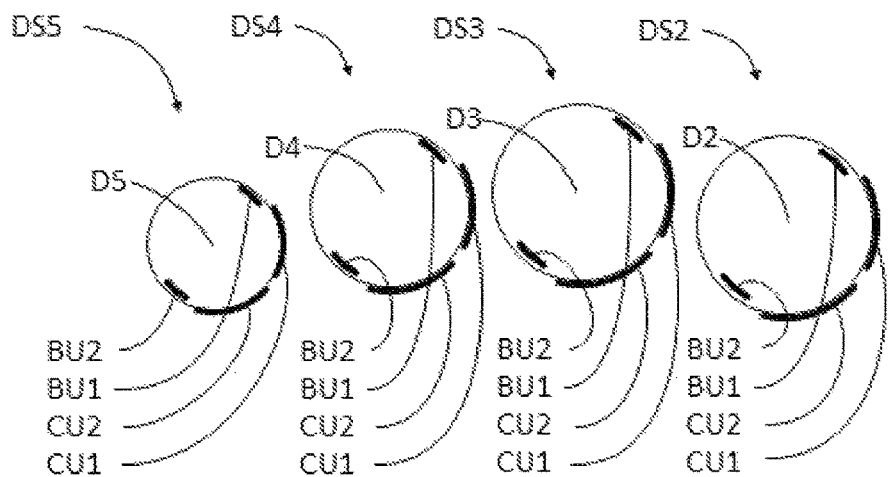
FIG. 16: Schematic front sectional view of possible disposition of body-contact and conductor-contact sensing units within digital sets.
Figure 17B:
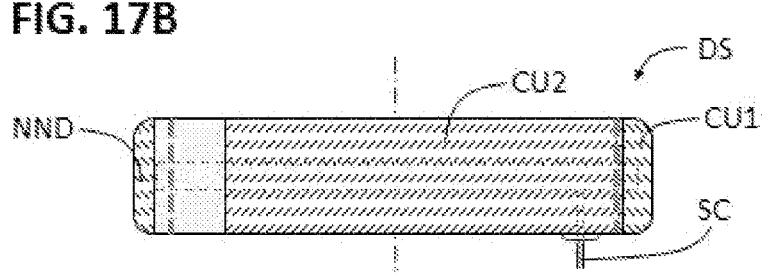
FIG. 17B: Bottom view of embodiment of FIG. 17A.
Figure 17A:
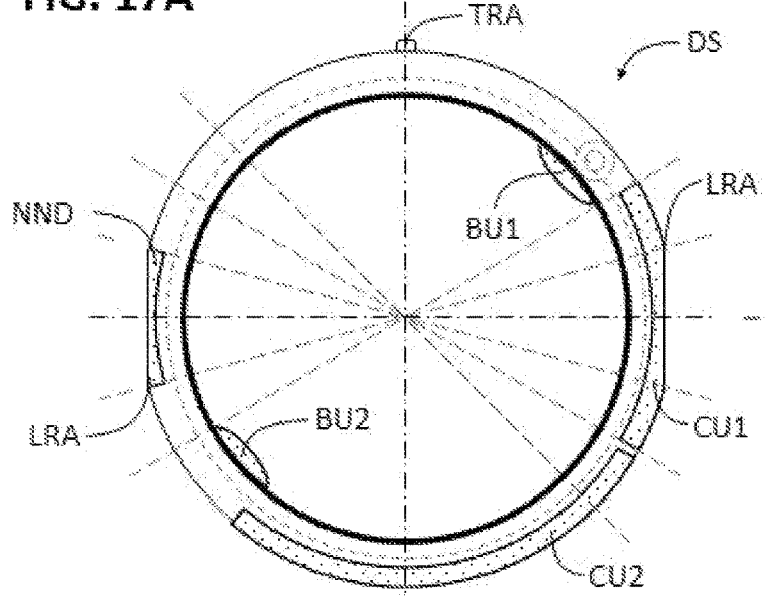
FIG. 17A: Front view of digital set with two body-contact sensing units and two conductor-contact sensing units.
Figure 17D:
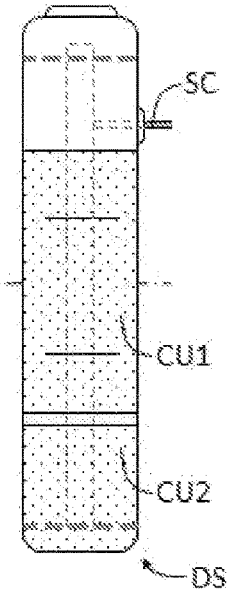
FIG. 17D: Right view of embodiment of FIG. 17A.
Figure 17C:
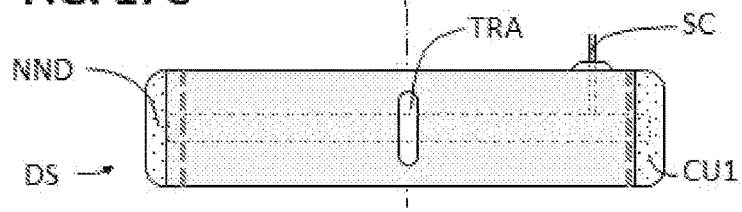
FIG. 17C: Top view of embodiment of FIG. 17A.

FIG. 16 is a schematic front view of preferred dispositions of body-contact sensing units BU1-BU2 and conductor-contact sensing units CU1-CU2 on each of four fully circled ring-based digital sets DS2-5 for respective right-hand digits D2-D5. Each of the shown digital sets DS2-5 has attached a first conductor-contact sensing unit CU1 placed by the radial side of the corresponding wearing digit (lateral side nearest to the thumb) and a second conductor-contact sensing unit CU2 placed by the volar side of the corresponding wearing digit (bottom or palm-side of the digit). Each of the shown digital sets DS2-5 also has attached a first body-contact sensing unit BU1 and a second body-contact sensing unit BU2 placed at diametrically opposite sides of the inner surface of the not-fingertip-set support.

FIGS. 17A-17B-17C-17D show several views (respectively front, top, bottom and lateral) of a ring-based digital set DS configured for a $3^{rd}$ or $4^{th}$ digit of a right-hand. The illustrated digital set DS comprises an integrated support with the shape of a fully circled ring, two conductor-contact sensing units CU1-CU2 configured to be placed respectively by the radial and volar side of the wearing digit, two diametrically opposed body-contact sensing units BU1-BU2 configured to be placed in direct contact with the skin of the wearing digit, one not-fingertip-set contact detector NND configured to be placed by the ulnar side of the wearing digit, and some auxiliary components (not shown). The digital set DS also includes a cabled signals/data connection unit SC (in this example located at the back top radial side of the of the digital set), a top rotation adjustment component TRA located at the top of the digital set, a flat-faced lateral rotation adjustor LRA and a not-fingertip-set contact detector NND at the volar side of the digital set, and another flat-faced lateral rotation adjustors LRA integrated with a conductor-contact sensing unit CU1 at the radial side of the digital set. Adjustment components TRA and LRA are configured to facilitate fast, easy and precise rotational and/or translational adjustment of the digital set into its specific optimal wearing position for operating the data-input device.

Figure 18A:
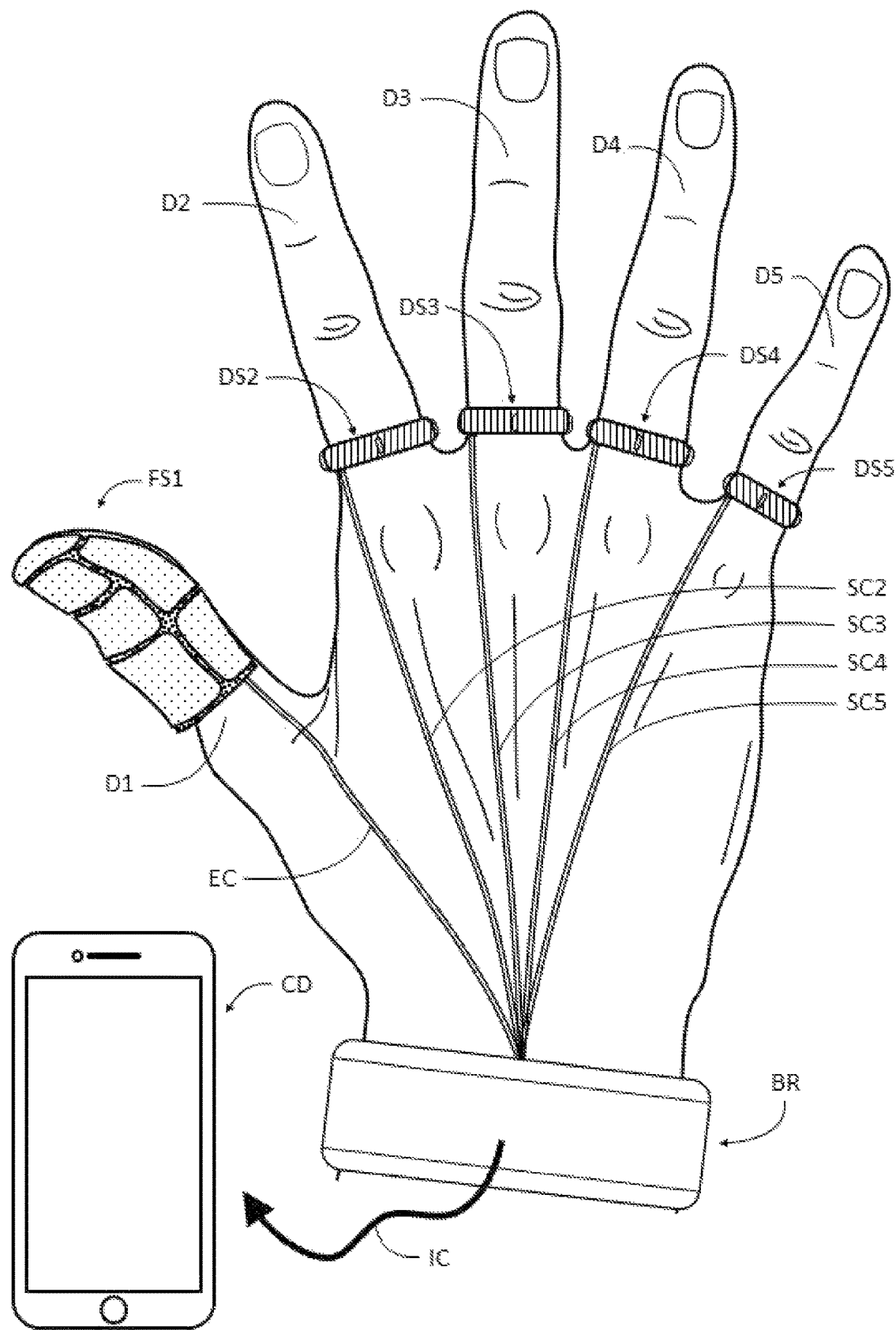
FIG. 18A: Dorsal-side-of-hand view of overall apparatus worn on right-hand, according to preferred embodiment of the invention.
Figure 18B:
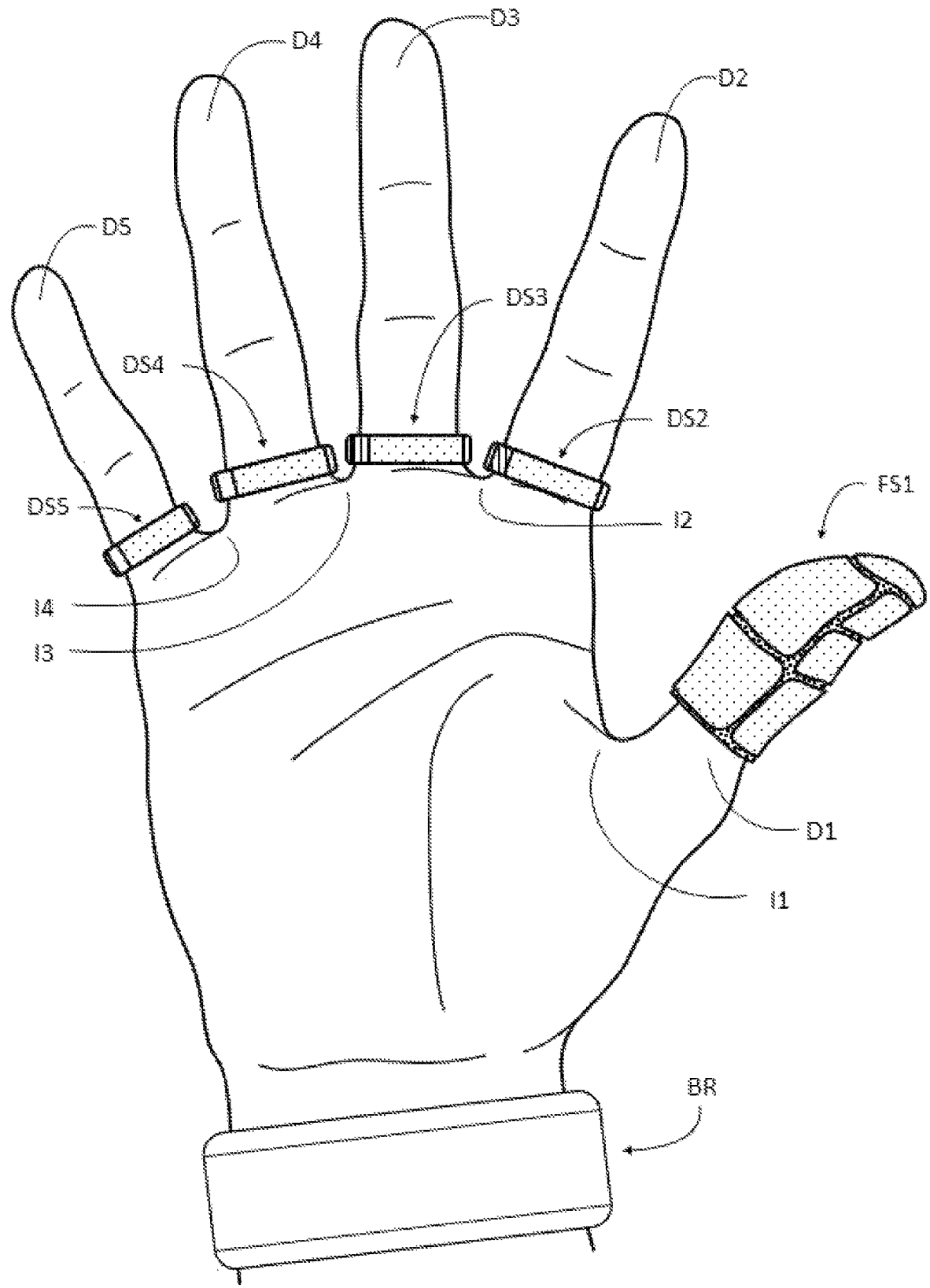
FIG. 18B: Palm-side-of-hand view of embodiment of FIG. 18A but not showing the client device.

FIGS. 18A-18B show a further embodiment of the invention worn on a right-hand presenting a dorsal-side-of-hand view (FIG. 18A) and a palm-side-of-hand-view (FIG. 18B), wherein FIG. 18A schematically also shows an associated client device CD and a wireless data-inputs connection unit IC to convey data-inputs from processing units (not shown) to the client device CD. Both figures show a right-hand wearing the data-input device comprising a hood-based thumb's fingertip set FS1 worn on thumb D1, four ring-based digital sets DS2-5 worn on digits D2-5, a bracelet BR worn on the wrist of the same hand, a cabled energy connection unit EC, and four cabled signals/data connection units SC2-5. The bracelet-type component BR contains at least one energy unit (not shown) and at least one processing unit (likewise not shown), and the cabled energy connection unit EC connects energy units with fingertip sensing units of the thumb's fingertip set FS1, and cabled signals/data connection units SC2-5 make the connection between body-contact sensing units and conductor-contact sensing units of respective digital sets DS2-5 and processing unit(s) hosted within a bracelet BR Presented configuration is only an exemplary embodiment, as energy connection units may convey power to any components of the data-input device. In this embodiment, the surface of the skin and nails of the hand is fundamentally free from coverings or occlusions except for a major top portion of the thumb D1 and the bottom proximal sections of digits D2-5. FIG. 18B also shows the interdigits of the hand I1-4.

Figure 19A:
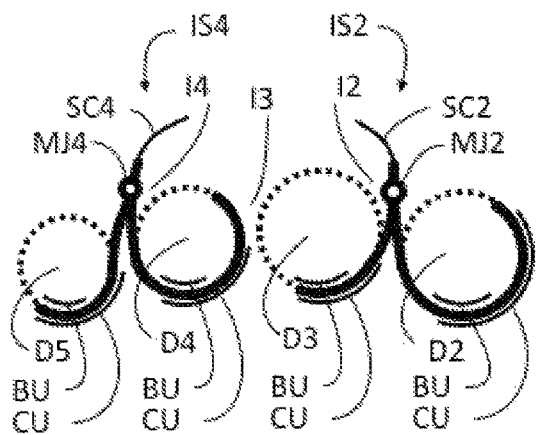
FIG. 19A: Schematic front sectional view of interdigital sets.
Figure 19B:
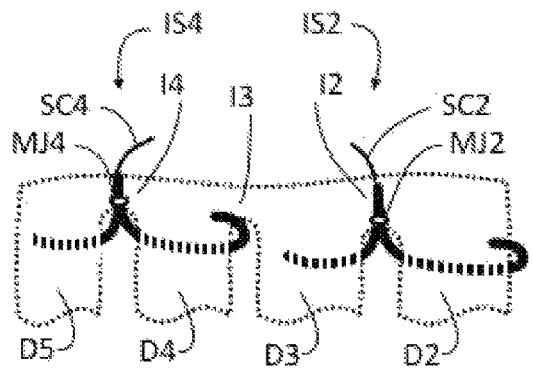
FIG. 19B: Schematic top view of embodiment of FIG. 19A.

FIGS. 19A-19B show a front sectional view (FIG. 19A) and a top dorsal-side-of-hand view (FIG. 19B) of an alternative embodiment of the invention with no digital sets and just two interdigital sets IS2 (worn on interdigit 2 with adjacent digits D2 and D3) and IS4 (worn on interdigit 4 with adjacent digits D4 and D5). Supports of interdigital sets IS2 and IS4 present a combination of a hook-like shape (worn in contact with an interdigit) and two partial ring-like shapes (worn in contact with proximal segments of digits adjacent to said interdigit). Each of the supports of inter-digital sets IS2 and IS4 is divided in two portions that can rotate relative to each other about a movable joint referred as MJ2 (if part of IS2) or MJ4 (if part of IS4). SC2 and SC4 show cabled signals/data connection units that make the connection between sensing units of the two interdigital sets and processing unit(s).

Figure 20A:
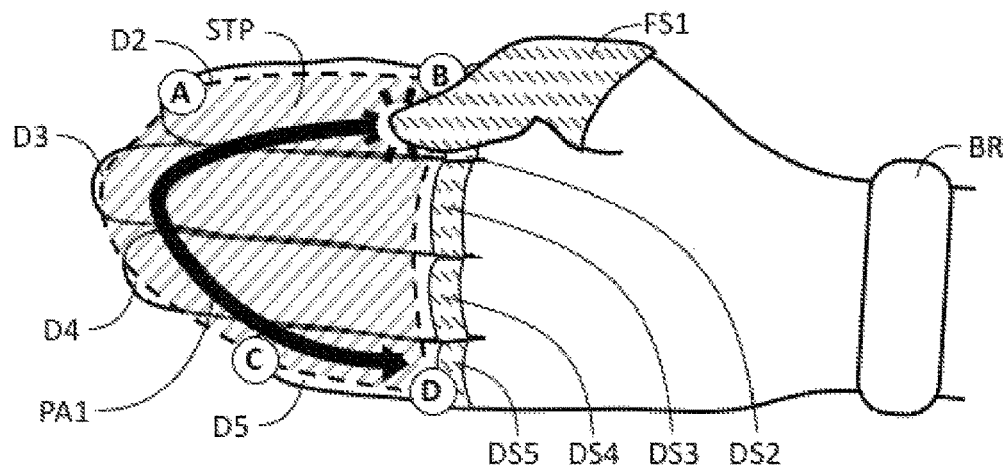
FIG. 20A: Palm-view of right-hand using the data-input device to execute a dynamic gesture on a specific skin touchpad.
Figure 20B:
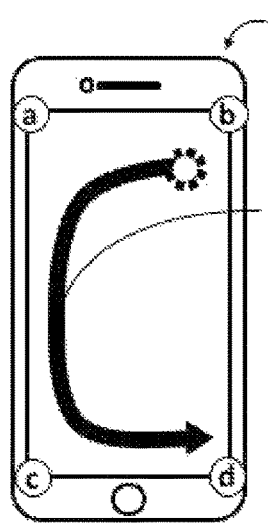
FIG. 20B: Path of movement along screen of a smartphone produced by the apparatus after processing dynamic gestures of FIG. 20A.
Figure 20C:
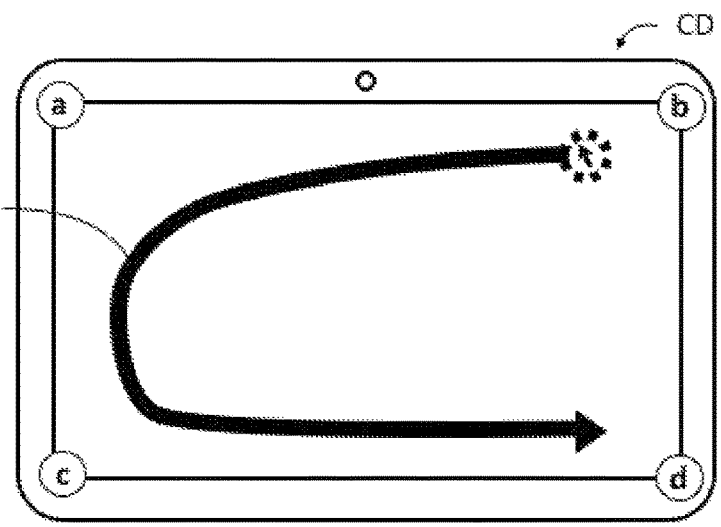
FIG. 20C: Path of movement of a cursor along screen of a computer/tablet produced by the apparatus after processing dynamic gestures of FIG. 20A.

FIGS. 20A-20B-20C illustrate a dynamic user-inputted gesture executed by a right-hand wearing the data-input device presented as fundamentally comprising a thumb's fingertip set FS1, four digital sets DS2-5 and a bracelet BR (rest of components not shown). In the illustrated case, the thumb wears a thumb's fingertip set FS1 and, whilst maintaining a dynamic touching contact with skin of volar faces of digits D2-5, it follows an approximately semi-circular path PA1 moving from top-right to left-center to bottom-right, within a "skin touchpad" STP delimited by imaginary points A-B-C-D on the palm of the user's hand. The dynamic user-inputted gestures on/over the skin touchpad (comprising the ensemble of the volar faces of digits D2-5) are converted by the data-input device into positional movements that describe a corresponding path PA2 along the rectangular screen, delimited by corners a-b-c-d, of a client device CD, which is exemplified as a smartphone (in FIG. 20B) or as a tablet or computer screen (in FIG. 20C). It is to be highlighted that neither discrete nor dynamic user-inputted gestures require the hand to be kept in a static position, as user-inputted gestures take place between different parts of the hand (instrumented or not with the data-input device) relative to each other. Moreover, in the case of skin-touching dynamic user-inputted gestures, skin touched surfaces do not necessarily need to be kept rigid. As way of example of this gesturing flexibility, in FIG. 20A, the 4 digits D2-5 or the right-hand forming the skin touchpad STP may bend and/or move relative to each other whilst path PA1 is drawn by the thumb's fingertip set FS1; in fact, these movements can actually facilitate adequate reach and improved quality of execution of the user-inputted gestures.

The exemplary embodiment depicted in FIGS. 20A-20B-20C refers to an example where the user executes a dynamic user-inputted gesture employing a worn fingertip set FS1 used as a pointer that can draw on a skin touchpad STP and wherein the data-input device interprets and transforms the user-inputted gestures into corresponding bi-dimensional positional data-inputs that are presented on the screen of a client device (CD) in the form of a drawn path.

A simpler example of an application also using a skin touchpad comprised by volar regions of digits 2-5 is that where not dynamic but static user-inputted gestures are executed on the skin touchpad (fingertip set used as if it were a pointer only used for selecting points on a screen). In this application, which is not illustrated, the data-input device interprets and transforms discrete touching actions between fingertip set and skin touchpad for example into equivalent bi-dimensional positional data-inputs that are presented on the screen of a client device in the form of a set of drawn points.

Another example of an application using skin touchpads is that where the skin touchpad is defined as the longitudinal radial areas of the index finger and dynamic user-inputted gestures comprising skin-touching sliding actions executed by the tip of a thumb's fingertip set along (up and down) said skin touchpad are interpreted and transformed into corresponding variances of an unidimensional data-input used by a client device (such as the volume of a music player). The described user-inputted gesture is similar to the one illustrated in FIG. 2.

In any of the prior described examples, prior to initiating the user-inputted gestures, the user would have executed a specific learnt chord to activate the skin touchpad to be used. Similarly, in order to deactivate the used skin touchpad, the user would have to execute another specific learnt chord.

Preparing the Data-Input Device

Following there is a list of explanatory steps on how the data-input device, in a preferred embodiment, is initiated and prepared for operation:

1) The user takes the data-input device which is fully folded and guarded with/within its bracelet and puts it on his/her wrist.

2) The user pulls out the thumb's fingertip set from the bracelet, puts it on his/her thumb and makes the necessary adjustments to assure it is properly placed with all conductive terminals of fingertip sensing units placed at/by specific spots/regions of the thumb.

3) The user pulls out the digital and/or interdigital sets from the bracelet, puts them on his/her digits 2-5 and/or interdigits 2-4 and makes the necessary adjustments (possibly with the aid of top or lateral rotational adjustors) to assure they are properly placed with all inwards-oriented conductive terminals of body-contact sensing units and outwards-oriented conductive terminals of conductor-contact sensing units placed at specific spots/regions of digits 2-5 and/or interdigits 2-4. The retrieving, putting on and adjusting maneuvers will vary in the way and easiness of execution depending on whether the data-input device comprises more or less number of digital/interdigital sets and bridging elements. As way of example, handling of only two interdigital sets, instead of four digital sets, could potentially be easier and faster without having to imply a reduction on the number and positioning of the not-fingertip sensing units.

4) The user activates the data-input device, for example via an auxiliary component such as an on-off switch, placed at the bracelet.

The user may also authenticate himself and unblock the data-input device for example via an auxiliary component in the form of a fingerprint sensor integrated with the thumb's fingertip sensing unit, or via a specific user-inputted gesture which is only known by the user and which can also possibly be linked to specific biometric and motional characteristics of the user's hand that are also read by the device.

5) The processing units run initial internal processes to check and assure adequate operating conditions such as readiness of components, availability of connections and suitability of environmental conditions.

6) The user checks the status of the data-input device by reading auxiliary components placed in the bracelet or integrated with other elements of the data-input device which indicate the results of the processes run by the processing units.

7) If needed or advised, the user may execute complementary processes such as those to partially/fully reset the data-input device, to calibrate it, to load configurational information like the hand gesture language he may want to use, or to customize its functioning according to his/her desires or to the specific shapes and motional characteristics of his/her hand.

Once done all checking, repairing, configuration and customization operations, the data-input device is ready for operation.

Operating the Data-Input Device with Static User-Inputted Gestures (Chords)

Following there is a list of explanatory steps on how the data-input device works when the user executes static user-inputted gestures or chords:

1) The user wants to generate a specific discrete user-inputted gesture to be entered into the client device, such as a hand sign meaning a command or a character, and he/she knows which specific chord needs to execute to generate the desired data-input (the command or character) as he/she already knows or can consult the specific hand gesture languages that are registered and activated in the data-input device.

2) If necessary, the user activates the mode to input chords via switching of an auxiliary component or via executing a specific chord or combination of chords.

3) The user executes a basic chord, for example consisting of a simple fingertip-skin contact, by moving his/her fingers/hand into a static touching position between a specific region of the thumb-worn fingertip set (implying contact of one or more specific fingertip sensing units) and a specific spot of the body tissue of his/her hand such as on the skin of his/her digits 4 (as in FIG. 3).

The user may also execute a basic chord consisting of a simple fingertip-not-fingertip contact by moving his/her fingers/hand into a static touching position between a specific region of the thumb-worn fingertip set (implying contact of one or more specific fingertip sensing units) and a specific spot of a not-fingertip set such as, for example, a conductor-contact sensing unit worn on the volar side of his/her index digit (as in FIG. 6).

The user may also execute a basic chord consisting of a simple not-fingertip-set contact such as, for example, approximating two adjacent digits of digits 2-5 in order to produce a touching contact between adjacent-worn digital sets, possibly detected with the aid of sensing components such as not-fingertip-set contact detectors.

The user may also execute user-inputted gestures that are combination of different types of contacts, these possibly being not only the aforementioned fingertip-skin contacts fingertip-not-fingertip contacts, or not-fingertip-set contacts but also skin-skin contacts.

And the user may also execute further complex chords such as interactions where several fingertip sensing units of the thumb's fingertip set are simultaneously engaged, and/or more than one spot/region of skin of a same digit is simultaneously touched (e.g. skin regions at both sides of a crest dividing them), and/or more than one conductor-contact sensing units is also simultaneously engaged, or even when skin-touching and not-fingertip set touching chords are combined.

The chords might also be executed with different types of contact time durations and pressure forces (this last case would be considered dynamic user-inputted gestures, as mass of human body tissue and/or of other auxiliary components of the device would be dynamically altered).

Identification of chords may be supported by additional identification of preceded or succeeded dynamic actions such as movements from the thumb's fingertip set approximating to one of digits 2-5 or of one of digits 2-5 approximating the thumb's fingertip set.

Executing a chord could for example replace the action of tapping a key on a smartphone's on-screen keyboard or of tapping a key or a combination of keys on a common computer keyboard.

4) In the case of a chord comprising a fingertip-skin contact between a fingertip sensing unit and a spot of skin of a digit (case of a fingertip-skin contact), the engaged fingertip sensing unit on the thumb's fingertip set senses electromagnetic signals from electromagnetic couplings between outwards-oriented conductive terminals of the engaged fingertip sensing unit and inwards-oriented conductive terminals of body-contact sensing units placed near the interphalangeal joints, via the human body tissue of the digit that has been contacted by the fingertip set.

Avoiding/mitigating electromagnetic couplings between the fingertip sensing unit and the human body tissue is achieved thanks to the insulating/guarding component(s) of the of the thumb's fingertip set.

If it is the case of a chord comprising a direct touching contact between a fingertip sensing unit and a conductor-contact sensing unit (case of a fingertip-not-fingertip contact), sensing of electromagnetic energy can be simplified to simple electrical sensing (detection of electrical current flowing between the conductive terminal(s) of the engaged fingertip sensing unit and the conductive terminal(s) of the engaged conductor-contact sensing unit, both participating in a same basic electrostatic circuit.

Improved quality in the interpretation of chords and extended range of interpretable user-inputted gestures can be greatly improved by the capability of the input-device to detect (or at least approximately guess detection) of additional skin-skin contacts (contacts that take place between different parts of human body tissue of the hand) and not-fingertip-set contacts (contacts between a part of a digital/interdigital set and either human body tissue of adjacent digits or other part of a same digital/interdigital set or another digital/interdigital set). Though possibly more difficult to sense than fingertip-skin contacts or fingertip-not-fingertip contacts, not-fingertip-set contacts and skin-skin contacts can also be sensed by the data-input device as any of such contacts inevitably alters, in a lesser or greater way, characteristics of the electromagnetic fields/circuits guided through human body tissue of the hand instrumented with the data-input device.

5) The body-contact and conductor-contact sensing units transmit sensed electromagnetic signals or data derived from them, to the processing units via the data connection units.

6) The processing units execute a variety of pre-processing processes to scan, clean, filter, refine, transform and prepare the received electromagnetic signals or raw-data into pre-processed data that can be adequately detected and interpreted in order to facilitate identification of correctly executed chords with maximal levels of accuracy. Some of these pre-processing functions can possibly be shifted to other components based in the not-fingertip sensing units.

7) The processing units also execute a variety of processes to convert the pre-processed data associated to the chord into a specific data-input. Alternatively, some or all of the data processing could be shifted from the data-input device to the client device.

8) The processing units send the generated data-inputs into the client device via a data-inputs connection unit. If some or all of the data processing is shifted to the client device, it is not final data-inputs, but raw-data or pre-processed data what is sent to the client device.

9) The client device receives and processes the data-inputs sent by the data-input device. If some or all of the data processing is shifted to the client device, it is not data-inputs, but raw-data or pre-processed data what is received and processed by the client device.

Operating the Data-Input Device with Dynamic User-Inputted Gestures

Following there is a list of explanatory steps on how the data-input device works when the user executes user-inputted gestures that are dynamic user-inputted gestures:

1) The user wants to generate a specific dynamic variation of a data-input for the client device, such as a gradual variation of a variable of the client device or a positional movement of an element within a screen of the client device.

The user knows how to execute the dynamic user-inputted gesture that will generate the desired dynamic variation of data-inputs. The transformational rules that will convert the user-inputted gestures to the data-inputs are already coded and uploaded into the data-input device and have been activated by the user, for example via the execution of a specific chord.

Some applications where dynamic user-inputted gestures are transformed into variations of data inputs (and where a specific region of the hand is used as a skin touchpad) are, for example, the following:

Moving of a vertical slider in a client device (linear positional data-inputs needed) is achieved by touching and moving the dorsal tip of the thumb's fingertip set up and down along the skin of tips of digits 2-5.

Moving of a horizontal slider in a client device (linear positional data-inputs needed) is achieved by touching and moving the dorsal tip of the thumb's fingertip set left and right along the skin of any of digits 2-5.

Moving of a cursor across a screen of a client device (bi-dimensional positional data-inputs needed) is achieved by touching and moving the volar tip of the thumb's fingertip set across the skin encompassed within the tips of digits 2-5, the proximal crests of digits 2-5, the whole radial side surface of digit 2 and the whole volar surface of digit 5.

In the aforementioned applications, that use advanced/enhanced configurations of the data-input device, the device senses, processes and transforms electromagnetic signals derived from dynamic user-inputted gestures using electromagnetic sensing in a similar way as with static user-inputted gestures, but having to interpret dynamic sensing readings as numerous discrete readings and having to sense and process varying electromagnetic couplings at a much greater speed as when, for example, interpreting a slowly-executed series of static user-inputted gestures.

2) If necessary, the user activates or deactivates the mode to allow entering of dynamic user-inputted gestures—via switching of an auxiliary component or via executing a specific chord or combination of chords.

Different dynamic user-input modes (implying different skin touchpads associated) may exist, e.g. to move a vertical slider, to move a horizontal slider, to move a cursor, etc.

3) The user executes the dynamic user-inputted gesture, for example by approximating and then touching and sliding his/her thumb-worn fingertip set along a portion of skin of one of digits 2-5, or by approximating and then touching and sliding, also with his/her thumb-worn fingertip set, a portion of one of his/her index-finger worn digital sets.

The dynamic user-inputted gestures, if touching, may be executed with different types of pressures and contact time durations.

Executing a dynamic user-inputted gesture with the data-input device could for example replace actions such as modifying the volume or light of the screen of an electronic device or such as moving a slider or placing a cursor on the screen of a smartphone, tablet, laptop or desktop computer.

4) As previously mentioned, rest of functioning steps for operating the data-input device with dynamic user-inputted gestures are fairly similar to those with static user-inputted gestures or chords, but with the differences of having to handle much higher amounts of data and of having to run faster and more intense and complex processes, consequently requiring advanced configurations of the data-input device including higher-end components of high performances with regards to varied capabilities such as sensitivity, connectivity, accuracy, processing performance, storage capacity, etc.

The implementation is by no means limited to the above embodiments and above-referenced aspects and functionalities, but many modifications and combinations can be made within the scope of the appending claims.

Glossary

Terms are capitalized when referred with codes/numerals in figures; they are also followed by synthetic explanatory notes.

Electromagnetism Related:
electromagnetic: relating to magnetic/electric phenomena, henceforth referred as EM
electromagnetic signals: signals of EM phenomena, EM radiations
electromagnetic coupling, transfer of EM energy between media
electromagnetic sensing: allows detection and quantification of changes of
quantity/position of dielectrics/conductors in EM fields/circuits
Human Body Related:
Digit (D): finger of the hand
Digit 1 (D1): thumb, 1st digit or 1st finger of the hand
Digits 2-5 (D2-5): 2nd, 3rd, 4th and 5th digits
Interdigit (I): interdigital area of hand
Interdigits 1-4 (I1-4): $1^{st}$, $2^{nd}$, $3^{rd}$ and $4^{th}$ interdigits
Skin (S): any human body tissue (skin, nail, . . . )

Sensing Units:
sensing unit: portion of EM sensor, henceforth referred as SU
Fingertip sensing Unit (FU): worn on tip of finger
not-fingertip sensing unit: not worn on tip of finger, can be body-contact sensing units and conductor-contact sensing units
Body-contact sensing Unit (BU): touching contact with human body tissue
Conductor-contact sensing Unit (CU): not touching human body tissue
Sensing Sets:
Fingertip Set (FS): integrates variety of fingertip SUs
Fingertip Set on digit 1 (FS1): fingertip set worn on thumb
not-fingertip set: integrates variety of not-fingertip SUs, can be digital sets and interdigital sets
Digital Set (DS): not-fingertip set worn on digit
Interdigital Set (IS): not-fingertip set worn on interdigit
Fingertip-Set Support (FSS): support of fingertip set (FS), FSS1-5 if worn on digits 1-5
User Inputs Related:
user-inputted gesture: digits/hand positions/movements
chord: static position or static gesture of digits, hand or parts of hand
dynamic gesture: movements (not static gesture) of digits, hand or parts of hand
Contact Types:
Fingertip-Skin contact (F-S): contact between fingertip set and human body tissue
Not-fingertip set contact (N-N): parts of not-fingertip sets contacting between them or with adjacent sets/skin
Fingertip-Not-fingertip contact (F-N): contact between fingertip sets and not-fingertip sets
Skin-Skin contact (S-S): contact between portions of human body tissue
Connections:
Signals/data Connection unit (SC): connections sensing units—processing units
data-Inputs Connection unit (IC): connections device—client device(s)
Energy-Connection unit (EC): connections of energy power to device
Other:
processing units: components with computing power
energy units: components with energy power
conductive terminal: made of conductive material, any shape
Auxiliary component (AUX): any auxiliary elements
Bridge (B): physically joins sets of SUs
Bracelet (BR): holder of device elements, worn on wrist
Client Device (CD): receives data-inputs produced by device
Skin TouchPad (STP): region of skin of hand configurable to act as tactile pads where static or dynamic contacts are executed by fingertip SUs
Insulating/shielding component (IN): to guide EM radiations, control EM couplings
Lateral Rotation Adjustor (LRA): at lateral of SUs set support, to adjust wearing
Top Rotational Adjustor (TRA): at top of SUs set support, to adjust wearing
Movable Joint (MJ): facilitates rotation between components
Not-fingertip-set contact Detector (NND): facilitates detection of N-N contacts
Path (PA): virtual path of fingertip SU movement
Ring Element (RE): ring-like supporting component.

What is claimed is:

1. A data-input device for using to enter data-inputs into an electronic or computing client device, wherein the data-input device is configured to be worn by a user on a hand;
wherein the data-inputs result from reading and interpreting user-inputted gestures consisting of positions and movements between a thumb of the hand and digits, other portions of the hand or components of the data-input device worn on the hand not on the thumb, relative to each other;
wherein reading and interpreting the user-inputted gestures is achieved via an electromagnetic sensing;
wherein the electromagnetic sensing is performed by sensing units, the sensing units configured to be placed at fingertips are called fingertip sensing units and the sensing units configured to be placed not at fingertips are called not-fingertip sensing units, wherein the fingertip sensing units are configured to be placed at specific spots of the fingertips and the not-fingertip sensing units are configured to be placed at specific spots of the hand not fingertips;
wherein the data-input device comprises:
at least one energy unit to provide an energy used by the data-input device,
at least one fingertip sensing unit worn on the thumb,
at least one not-fingertip sensing unit worn on an interdigit or on a digit that is not the thumb wherein the at least one not-fingertip sensing unit is a body-contact sensing unit,
at least one processing unit to generate the data-inputs to be sent to the electronic or computing client device and to process information from an electromagnetic coupling sensed by the sensing units between the at least one fingertip sensing unit and the not-fingertip sensing units,
at least one energy connection unit to transmit, wirelessly or via cable, a power from the at least one energy unit to other components of the data-input device,
at least one signals/data connection unit to connect, wirelessly or via cable, the sensing units with the at least one processing unit,
at least one data-inputs connection unit to connect, wirelessly or via cable, the at least one processing unit with the electronic or computing client device,
wherein the at least one fingertip sensing unit further comprises:
at least one outwards-oriented conductive terminal configured not to be in direct contact with a human body tissue;
insulating or electromagnetic shielding means;
fixation means to fix and support the at least one fingertip sensing unit and to assure a removable attachment of whole or part of the at least one fingertip sensing unit;
wherein when the data-input device comprises two or more fingertip sensing units, electromagnetic signals used by the two or more fingertip sensing units are generated at different frequencies or with different wavelengths, wave amplitudes or other characteristics to enable a unique identification of each individual fingertip sensing unit of the two or more fingertip sensing units when participating in the user-inputted gestures and to facilitate a simultaneous multi-channeled electromagnetic coupling between the two or more fingertip sensing units on a one side and the not-fingertip sensing units on another side; and
wherein the body-contact sensing unit comprises a conductive terminal with a sensing face configured to be in direct touch with the human body tissue of the hand, and wherein the body-contact sensing unit is configured to sense the electromagnetic coupling wherein the human body tissue acts as dielectric between the at least one fingertip sensing unit and the body-contact sensing unit.

2. The data-input device according to claim 1, wherein the data-input device further comprises one or more of the not-fingertip sensing units, wherein the one or more of the not-fingertip sensing units are worn on interdigits of the hand or on digits that are not the thumb;
  wherein the one or more of the not-fingertip sensing units are at least one of:
  body-contact sensing units, and
  conductor-contact sensing units with outwards oriented conductive terminals not in touch with the human body tissue and configured to sense the electromagnetic coupling, wherein none or variable amount of air acts as dielectric;
  wherein when the one or more of the not-fingertip sensing units are worn on a same digit, the one or more of the not-fingertip sensing units are integrated into a first set of elements with a common support, wherein the first set of elements is called a digital set; and
  wherein when the one or more of the not-fingertip sensing units are worn on a same interdigit, the one or more of the not-fingertip sensing units are integrated into a second set of elements with a common support, wherein the first set of elements is called an interdigital set.

3. The data-input device according to claim 2, wherein the outwards-oriented conductive terminals of the conductor-contact sensing units are configured to be placed by at least one of a volar and a radial side of proximal segments of the digits.

4. The data-input device according to claim 2, wherein each body-contact sensing unit comprises:
  at least one first conductive terminal configured to be in touch with the human body tissue,
  first insulating or electromagnetic shielding means,
  first fixation means to fix and support the each body-contact sensing unit and to assure removable attachment of whole or part of the each body-contact sensing unit;
  wherein each conductor-contact sensing unit comprises:
  at least one second conductive terminal configured not to be in touch with the human body tissue,
  second insulating or electromagnetic shielding means,
  second fixation means to fix and support the each conductor-contact sensing unit and to assure removable attachment of whole or part of the each conductor-contact sensing unit.

5. The data-input device according to claim 2, wherein the common support of the digital set presents a shape of a fully or partially circled ring-like element configured to be worn on proximal segments of the digits.

6. The data-input device according to claim 5, wherein the common support of the digital set presents adjustment components or adaptations to allow rotational or translational adjusting of supported not-fingertip sensing units into specific wearing/operating positions of the supported not-fingertip sensing units.

7. The data-input device according to claim 5, wherein the digital set or the interdigital set comprises a not-fingertip-set contact detector detecting touching contacts with an intervention of the digital set or the interdigital set and without an intervention of the at least one fingertip sensing unit.

8. The data-input device according to claim 5, wherein adjacent digital sets or adjacent interdigital sets are joined to each other by flexible bridging elements.

9. The data-input device according to claim 2, wherein the common support of the interdigital set presents a shape comprising a combination of a hook-like shape, wherein the hook-like shape is configured to be worn on the interdigit, and two partially circled ring-like shapes, wherein the two partially circled ring-like shapes are configured to be worn on proximal segments of digits adjacent to the interdigit.

10. The data-input device according to claim 9, wherein the common support of the interdigital set comprises a movable joint to allow an articulated connection between two parts of the common support of the interdigital set, wherein the movable joint is configured to induce a separation avoid an approximation of the two parts of the common support of the interdigital set from each other while keeping the two parts of the common support of the interdigital set connected via the movable joint.

11. The data-input device according to claim 9, wherein the digital set or the interdigital set comprises a not-fingertip-set contact detector detecting touching contacts with an intervention of the digital set or the interdigital set and without an intervention of the at least one fingertip sensing unit.

12. The data-input device according to claim 9, Wherein adjacent digital sets or adjacent interdigital sets are joined to each other by flexible bridging elements.

13. The data-input device according to claim 2, further comprising a bracelet-type component worn on a wrist of the hand, Wherein the bracelet-type component is configured to facilitate a temporary hosting of all or part of the components of the data-input device.

14. The data-input device according to claim 2, wherein the body-contact sensing units are at least two in number and worn on different digits, and wherein the at least one processing unit is configured to enable using delimited surfaces of a skin of the hand as touchpads, wherein, on the touchpads, dynamic gestures, consisting of positioning or sliding a fingertip set acting as a pointer, are converted into dynamic variations of the data-inputs for the electronic or computing client device.

15. The data-input device according to claim 2, wherein when one or more of the body-contact sensing units are worn on a same digit of the hand, the one more of the body-contact sensing units are supported and attached to the digit by a non-removable support configured as a full implant of the one or more of the body-contact sensing units inside the human body tissue of the digit of the user leaving the one or more of the body-contact sensing units completely under a skin and in contact with the human body tissue.

16. The data-input device according to claim 1, wherein when one or more of the fingertip sensing units are worn on the thumb, the one or more of the fingertip sensing units are integrated into a set of elements with a common support, wherein the set of elements is called a fingertip set; and
  Wherein the common support of the fingertip set presents any of the following configurations:
  a hood-like element configured to be worn on the thumb fully or partially covering or wrapping a fingertip of the thumb or other parts of a skin surface of the thumb;
  a ring-like element, wherein the ring-like element is fully or partially circled and configured to be worn on the thumb partially covering or occluding the skin surface of the thumb, comprising an attached hood-like element, wherein the attached hood-like element is attached to the ring-like element and is configured to be worn on or over the thumb fully or partially covering or wrapping the fingertip of the thumb;

an attachment mechanism configured to allow an engagement/disengagement with/from a small auxiliary component, wherein the small auxiliary component is fixedly attached to a fingernail of the thumb;

an artificial nail complementing, extending or replacing the fingernail of the thumb and integrating the at least one fingertip sensing unit;

a partial implant of the at least one fingertip sensing unit, wherein the at least one fingertip sensing unit is located inside the human body tissue of the fingertip of the user leaving the at least one outwards-oriented conductive terminal of the at least one fingertip sensing unit facing to an outside and sticking out of a skin of the fingertip; and any of the following combinations:

the ring-like element combined with the hood-like element;

the ring-like element combined with the attachment mechanism or the like;

the ring-like element combined with the artificial nail;

the ring-like element combined with the partial implant.

17. The data-input device according to claim 16, further comprising a bracelet-type component worn on a wrist of the hand, wherein the bracelet-type component is configured to facilitate a temporary hosting of all or part of the components of the data-input device.

18. The data-input device according to claim 1, wherein the data-input device further comprises:
one or more of the fingertip-sensing units worn on digits that are not the thumb, or
one or more of the not-fingertip sensing units worn on the thumb.

19. The data-input device according to claim 1, further comprising a bracelet-type component worn on a wrist of the hand, wherein the bracelet-type component is configured to facilitate a temporary hosting of all or part of the components of the data-input device.

20. The data-input device according to claim 1, wherein the body-contact sensing units are at least two in number and worn on different digits, and wherein the at least one processing unit is configured to enable using delimited surfaces of a skin of the hand as touchpads, wherein, on the touchpads, dynamic gestures, consisting of positioning or sliding a fingertip set acting as a pointer, are converted into dynamic variations of the data-inputs for the electronic or computing client device.

* * * * *